United States Patent
Umehara

(10) Patent No.: US 12,377,442 B2
(45) Date of Patent: *Aug. 5, 2025

(54) VIBRATION GENERATOR MOVING VIBRATOR BY MAGNETIC FIELD GENERATED BY COIL AND VIBRATOR-MOUNTED HOLDER USED IN VIBRATION-GENERATOR

(71) Applicant: MINEBEA MITSUMI Inc., Nagano (JP)

(72) Inventor: Mikio Umehara, Yonago (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,159

(22) Filed: Jan. 12, 2024

(65) Prior Publication Data

US 2024/0139773 A1    May 2, 2024

Related U.S. Application Data

(60) Continuation of application No. 18/185,619, filed on Mar. 17, 2023, now Pat. No. 11,904,359, which is a
(Continued)

(30) Foreign Application Priority Data

Jan. 22, 2013   (JP) ................. 2013-008961

(51) Int. Cl.
*B06B 1/04* (2006.01)
*G01M 7/02* (2006.01)
(Continued)

(52) U.S. Cl.
CPC ............. *B06B 1/045* (2013.01); *G01M 7/027* (2013.01); *H02K 1/34* (2013.01); *H02K 33/16* (2013.01)

(58) Field of Classification Search
CPC ......... B06B 1/045; G01M 7/027; H02K 1/34; H02K 33/16
See application file for complete search history.

(56) References Cited

U.S. PATENT DOCUMENTS 5,495,762 A   3/1996   Tamura et al.
6,054,335 A   4/2000   Sun et al.
(Continued)

FOREIGN PATENT DOCUMENTS

DE   10 2008 051 126 A1   5/2009
EP         0970758 A1   1/2000
(Continued)

OTHER PUBLICATIONS

May 12, 2020 Office Action issued in German Patent Application No. 10 2014 100 525.2.
(Continued)

*Primary Examiner* — Tarun Sinha
(74) *Attorney, Agent, or Firm* — Chrisman Gallo Tochtrop LLC

(57) ABSTRACT

A vibrator-mounted holder is attached to a casing of a vibration generator which moves a vibrator to generate a vibration when used. The vibrator-mounted holder includes a vibrator, a vibrator retention unit retaining the vibrator, a fixing unit fixed to a casing, and an arm. The vibrator includes a magnet having a plate shape parallel to a horizontal surface and a yoke arranged on the magnet. The arm connects the fixing unit to the vibrator retention unit, and supports the vibrator retention unit in a manner that the vibrator retention unit is displaceable with respect to the fixing unit. The yoke has a projecting portion which is projected downward and fixed to the vibrator retention unit. The arm is connected to a portion, at which the projecting portion is arranged, within the vibrator retention units.

4 Claims, 19 Drawing Sheets

Related U.S. Application Data continuation of application No. 16/994,812, filed on Aug. 17, 2020, now Pat. No. 11,642,696, which is a continuation of application No. 16/418,216, filed on May 21, 2019, now Pat. No. 10,780,457, which is a division of application No. 15/450,895, filed on Mar. 6, 2017, now Pat. No. 10,350,637, which is a continuation of application No. 14/103,299, filed on Dec. 11, 2013, now Pat. No. 9,989,437.

(51) Int. Cl.
*H02K 1/34* (2006.01)
*H02K 33/16* (2006.01)

(56) References Cited

U.S. PATENT DOCUMENTS

| | | | |
|---|---|---|---|
| 7,671,493 | B2 | 3/2010 | Takashima et al. |
| 7,692,346 | B2 | 4/2010 | Kobayashi et al. |
| 8,624,450 | B2 | 1/2014 | Dong et al. |
| 9,590,463 | B2 | 3/2017 | Kuroda et al. |
| 10,780,457 | B2 * | 9/2020 | Umehara ............ H02K 33/16 |
| 11,642,696 | B2 * | 5/2023 | Umehara ............ H02K 1/34 |
| | | | 73/664 |
| 2003/0169895 | A1 | 9/2003 | Fukuyama |
| 2004/0169425 | A1 | 9/2004 | Aihara |
| 2009/0096299 | A1 | 4/2009 | Ota et al. |
| 2009/0267423 | A1 | 10/2009 | Kajiwara et al. |
| 2010/0213773 | A1 | 8/2010 | Dong et al. |
| 2011/0051987 | A1 | 3/2011 | Ueda et al. |
| 2011/0089772 | A1 | 4/2011 | Dong et al. |
| 2011/0101797 | A1 | 5/2011 | Lee et al. |
| 2011/0241451 | A1 | 10/2011 | Park |
| 2011/0243368 | A1 | 10/2011 | Doh et al. |
| 2012/0032534 | A1 | 2/2012 | Choi |
| 2012/0049660 | A1 | 3/2012 | Park |
| 2012/0104875 | A1 | 5/2012 | Park |
| 2012/0313459 | A1 | 12/2012 | Zhang |
| 2013/0076178 | A1 * | 3/2013 | Kuroda ............ H02K 33/00 |
| | | | 310/81 |

FOREIGN PATENT DOCUMENTS

| | | |
|---|---|---|
| EP | 1515420 A1 | 3/2005 |
| JP | H02-243918 A | 9/1990 |
| JP | H05-88242 U | 12/1993 |
| JP | H09-85169 A | 3/1997 |
| JP | H10-14194 A | 1/1998 |
| JP | H10-14195 A | 1/1998 |
| JP | H10-308047 A | 11/1998 |
| JP | H11-192455 A | 7/1999 |
| JP | H11-214586 A | 8/1999 |
| JP | H11-275846 A | 10/1999 |
| JP | 2000-021491 A | 1/2000 |
| JP | 2002-200460 A | 7/2002 |
| JP | 2002-225067 A | 8/2002 |
| JP | 2002-361174 A | 12/2002 |
| JP | 2003-24871 A | 1/2003 |
| JP | 2003-154314 A | 5/2003 |
| JP | 2003-515435 A | 5/2003 |
| JP | 2003-305409 A | 10/2003 |
| JP | 2004-023909 A | 1/2004 |
| JP | 2004-104906 A | 4/2004 |
| JP | 2004-195444 A | 7/2004 |
| JP | 2004-261684 A | 9/2004 |
| JP | 2005-12935 A | 1/2005 |
| JP | 2005-012987 A | 1/2005 |
| JP | 2005-028331 A | 2/2005 |
| JP | 2005-195639 A | 7/2005 |
| JP | 2005-303895 A | 10/2005 |
| JP | 2006-150310 A | 6/2006 |
| JP | 2006-216925 A | 8/2006 |
| JP | 2006-320887 A | 11/2006 |
| JP | 2007-104898 A | 4/2007 |
| JP | 2008-154303 A | 7/2008 |
| JP | 2009-081913 A | 4/2009 |
| JP | 2009-100595 A | 5/2009 |
| JP | 2009-213952 A | 9/2009 |
| JP | 2009-303443 A | 12/2009 |
| JP | 2010-29037 A | 2/2010 |
| JP | 2010-082508 A | 4/2010 |
| JP | 2010-089061 A | 4/2010 |
| JP | 2010-094567 A | 4/2010 |
| JP | 2011-019384 A | 1/2011 |
| JP | 2011-072856 A | 4/2011 |
| JP | 2011-097747 A | 5/2011 |
| JP | 2011-115672 A | 6/2011 |
| JP | 2011-173074 A | 9/2011 |
| JP | 2011-205870 A | 10/2011 |

OTHER PUBLICATIONS

Jul. 19, 2016 Office Action issued in Japanese Patent Application No. 2013-008961.
Jan. 31, 2017 Office Action issued in Japanese Patent Application No. 2016-204923.
Dec. 12, 2017 Office Action issued in Japanese Patent Application No. 2017-064681.
Oct. 17, 2022 Office Action issued in German Patent Application No. 102014020024.8.

* cited by examiner

FIG.2
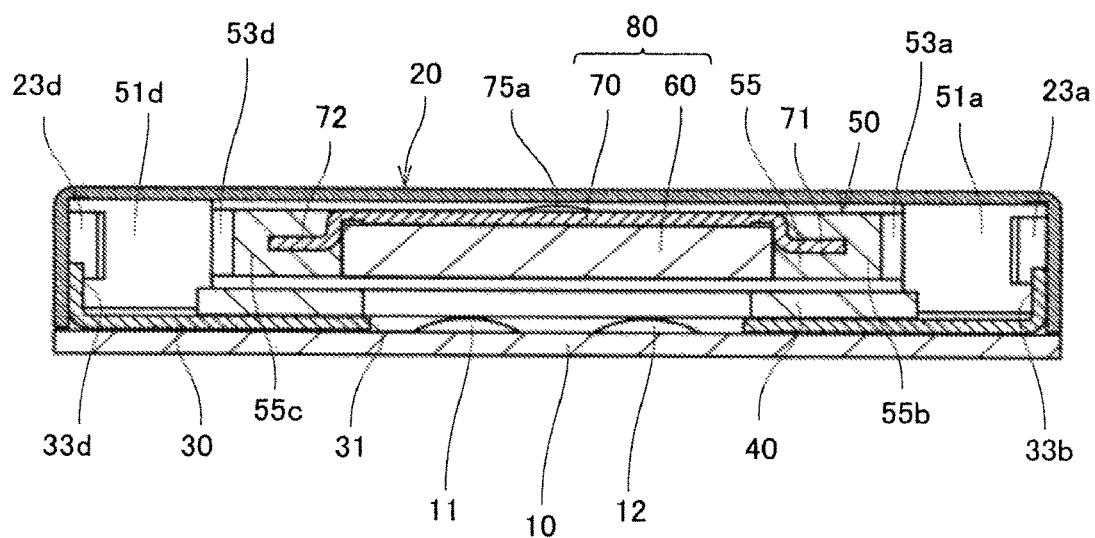
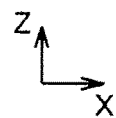

FIG.9
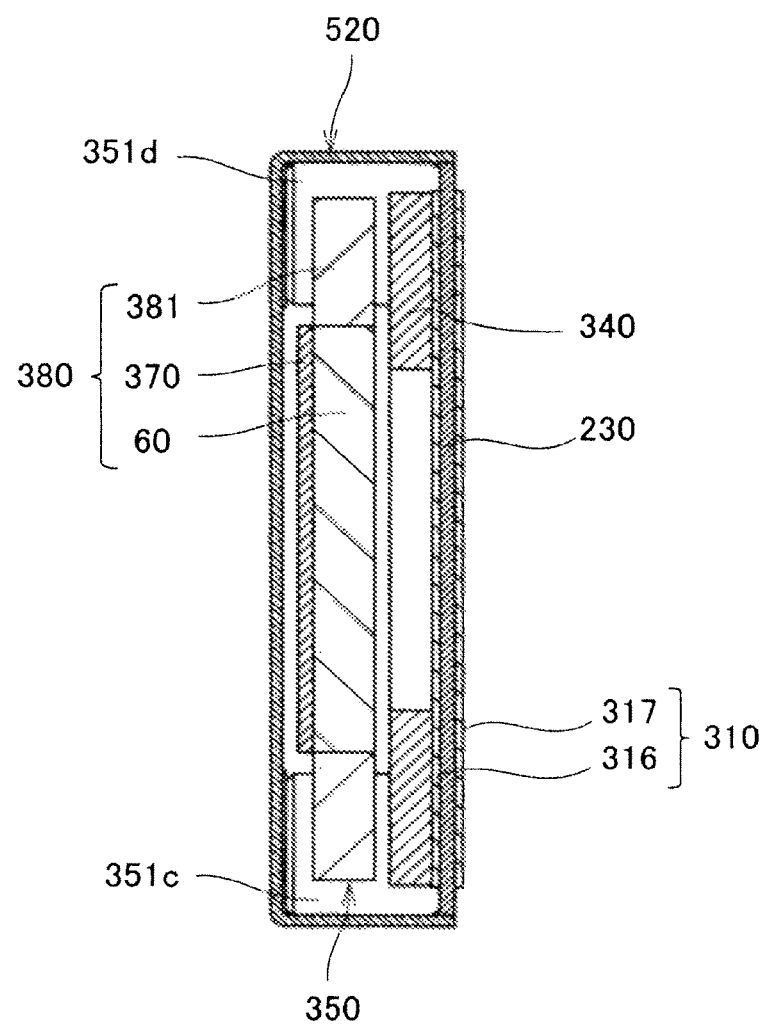

VIBRATION GENERATOR MOVING VIBRATOR BY MAGNETIC FIELD GENERATED BY COIL AND VIBRATOR-MOUNTED HOLDER USED IN VIBRATION-GENERATOR

CROSS-REFERENCE TO RELATED APPLICATIONS

This is a Continuation of U.S. application Ser. No. 18/185,619 filed Mar. 17, 2023, which is a Continuation of U.S. application Ser. No. 16/994,812 filed Aug. 17, 2020, which is a Continuation of U.S. application Ser. No. 16/418,216, filed May 21, 2019, which is a Divisional of U.S. application Ser. No. 15/450,895, filed Mar. 6, 2017, which is a Continuation of application Ser. No. 14/103,299 filed Dec. 11, 2013, which claims the benefit of Japanese Patent Application No. 2013-8961 filed with the Japan Patent Office on Jan. 22, 2013. The disclosures of the prior applications are hereby incorporated by reference herein in their entirety.

BACKGROUND OF THE INVENTION

Field of the Invention

The present invention relates to a vibration generator, particularly to a vibration generator that moves a vibrator to generate a vibration by passage of a current through a coil.

DESCRIPTION OF THE RELATED ART

As a vibration generator that moves a vibrator to generate vibration, a variety of vibration generators are used which has a structure in which a vibrator including a magnet weight is supported by a chassis with a plate spring interposed. This vibration generator includes a coil arranged under the magnet. The coil is disposed opposite the magnet. The vibrator moves while deforming the spring, in conjunction with generation of a magnetic field induced by an electric current which flows through the coil.

Document 1 discloses a vibration generator having a structure in which a vibration unit having the magnet is supported using a plate spring. In the vibration generator, one plate-like coil is disposed opposite the magnet of the vibration unit. One end of the plate spring is fixed to a chassis with a screw. The other end of the plate spring is fixed to a weight of the vibration unit by caulking.

Document 2 discloses a vibration generating device, in which the magnet is attached to a movable block and the coil is wound around a rod-shaped yoke body disposed along the magnet. In the vibration generator, a spring unit supporting movable block, a rim unit of frame and the like are integrally molded using resin material.

[Document 1] Japanese Patent Publication Laying-Open No. 2003-24871

[Document 2] Japanese Patent Publication Laying-Open No. 2010-94567

The vibration generator disclosed in Document 1 supports the vibrator using a plate spring attached to the chassis. Therefore, the structure of an attachment unit for attaching the plate spring to the chassis is complicated. Specifically, in the vibration generator disclosed in Document 1, the plate spring is attached to the chassis using a screw. Therefore, the steps of assembling the vibration generator are complicated, the number of parts increases, and the manufacturing cost of the vibration generator increases.

Such a problem becomes more serious as the demand for smaller and a thinner vibration generator increases. That is, as a vibration generator is smaller, components of the vibration generator is also smaller; therefore, instead of screwing and clamping, an attaching method such as spot welding is necessary. Therefore, the structure of the attachment unit for attaching components to each other becomes complicated. For example, when spot welding is performed to the attachment unit which attaches the plate spring to the chassis, the attachment unit should be welded in many positions so that high reliability of the vibration generator can be achieved, and thus time and effort for manufacture increase. It is because the portions which have undergone spot welding become comparatively vulnerable to an impulsive force.

Furthermore, it is necessary for the vibration generator not to easily break down but have high reliability. In this vibration generator, in order for the vibration generator to generate a big vibration with high efficiency and to have a thinner body, it is desirable to narrow a gap between the coil and the vibrator containing the magnet therein. However, when the gap is narrowed, there is a problem that the vibrator easily comes into contact with the coil or the like when the vibrator vibrates in an up-and-down direction.

The present invention was made to solve the above problems, and an object thereof is to provide a vibrator-mounted holder and a vibration generator, which can be easily assembled, can be manufactured at low cost, and have high reliability.

SUMMARY OF THE INVENTION

In order to achieve the above object, according to one aspect of the present invention, there is provided a vibrator-mounted holder attached, for use, to a chassis of a vibration generator configured to generate a vibration by moving a vibrator, the vibrator-mounted holder including: a vibrator including a magnet which has a plate shape parallel to a horizontal surface, and a yoke arranged on the magnet; a vibrator retention unit retaining the vibrator; a fixing unit fixed to the chassis; and an arm connecting the vibration retention unit and the fixing unit to each other and supporting the vibrator retention unit in a manner that the vibrator retention unit is displaceable with respect to the fixing unit, wherein the yoke includes a projecting portion which is projected down, the projecting portion is fixed to the vibrator retention unit, and the arm is connected to a portion, at which the projecting portion is arranged, within the vibrator retention unit.

According to another aspect of the present invention, there is provided a vibration generator including a chassis; the vibrator-mounted holder described above, the vibrator-mounted holder retaining the vibrator in a manner that the vibrator is displaceable with respect to the chassis; and a coil for generating a magnetic field for changing at least one of a position and a posture of the vibrator with respect to the chassis, wherein the vibrator-mounted holder is attached to the chassis in a state where the arm switches to an extended state from a natural state.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a sectional view taken on a line A-A of FIG. 1.

FIG. 9 is a cross-sectional side view of the vibration generator according to the second embodiment.

DESCRIPTION OF THE PREFERRED EMBODIMENTS

Hereinafter, a vibration generator using a vibrator-mounted holder according to an exemplary embodiment of the present invention will be described with reference to the drawings.

The vibration generator has a structure in which a vibrator holding a magnet is supported by a chassis in a manner capable of being able to be displaced relative to the chassis. A coil is arranged near the vibrator. The vibrator generates a magnetic field for changing at least one of a position and a posture of the vibrator with respect to the chassis. The vibration generator is a so-called linear type vibration generator which generates a vibration force by causing the vibrator to reciprocate according to magnetization of the coil.

First Embodiment

Figure 1:
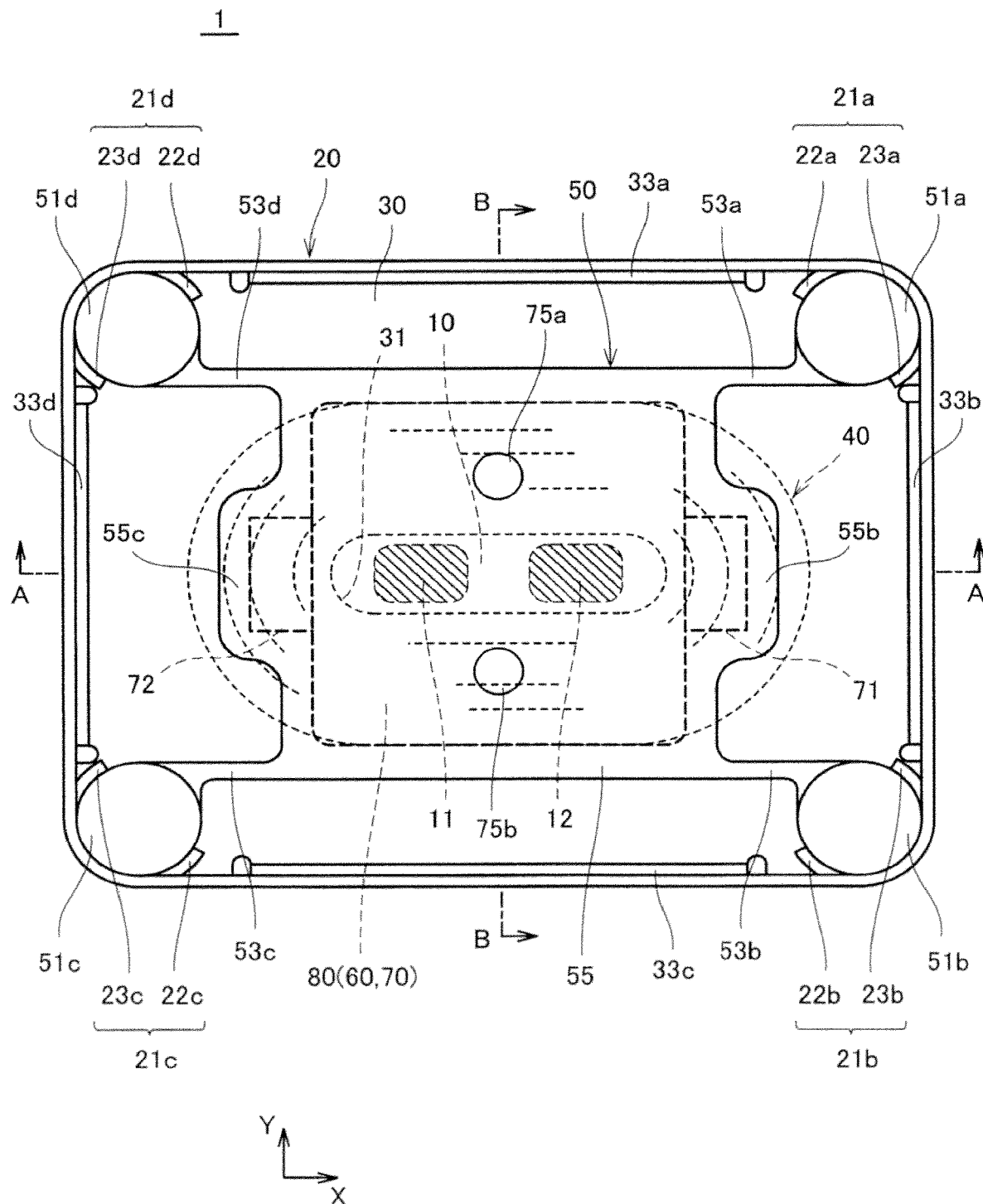
FIG. 1 is a plan view illustrating a vibration generator according to a first embodiment of the present invention.

FIG. 1 is a plan view illustrating a vibration generator according to a first embodiment of the present invention. FIG. 2 is a sectional view taken on a line A-A of FIG. 1.

In FIG. 1, a holder 50 and the like, which are originally hidden behind an upper surface of a frame 20, are partially illustrated by a solid line for the purpose of easy understanding of a component layout in a vibration generator 1.

In the following description, with respect to vibration generator 1, sometimes an X-axis direction of an coordinate in FIG. 1 is referred to as a crosswise direction (a positive direction of an X-axis is a right direction when viewed from an origin of the coordinate), and a Y-axis direction is referred to as a front-back direction (a positive direction of a Y-axis is backward when viewed from the origin). Sometimes a Z-axis direction (direction perpendicular to an XY-plane in FIG. 1) in FIG. 2 is referred to as a vertical direction (a positive direction of a Z-axis is upward when viewed from the origin).

[Entire Structure of Vibration Generator 1]

As illustrated in FIG. 1, vibration generator 1 includes a double-sided substrate (an example of a substrate) 10, frame (an example of a chassis) 20, a bottom plate 30, a coil 40, and holder 50 roughly. In the present embodiment, holder 50 includes four pillar bodies (an example of a fixing unit) 51 (51a, 51b, 51c, 51d), four arms 53 (53a, 53b, 53c, 53d), and one vibrator retention unit (hereinafter, this may be simply referred to as a retention unit) 55. A vibrator 80 which is configured by a magnet 60 and a yoke 70 is held by retention unit 55.

Vibration generator 1 is formed into a substantially thin rectangular solid body where a vertical size is relatively small, as a whole. Vibration generator 1 is a small object which is, for example, only about 10 millimeters to 20 millimeters in each of outside dimensions in the crosswise direction and the front-back direction. Vibration generator 1 has a box-shaped external form where side surfaces on left, right, front, and back sides, and an upper surface are configured by frame 20 and a bottom surface is covered with double-sided substrate 10.

According to the present embodiment, frame 20 and yoke 70 are soft magnetic material, such as iron, for example.

Double-sided substrate 10 is a printed wiring board having patterns on both surfaces thereof. Two terminals 11 and 12 are provided in a center portion of an upper surface of double-sided substrate 10. Terminals 11 and 12 are electrically connected to the pattern (not illustrated) provided on the bottom surface of double-sided substrate 10. A winding end of coil is connected to terminals 11 and 12 using solder, and can be electrically connected to coil 40 with the pattern on the bottom surface of double-sided substrate 10. The method of connecting the winding end of coil 40 is not limited to soldering, but coil 40 may be connected to terminals 11 and 12 using a technique such as resistance welding or laser welding.

Bottom plate 30 is a rectangular plate so that bottom plate 30 can cover almost the entire upper surface of double-sided substrate 10. Bottom plate 30 and double-sided substrate are fixed to each other, for example, with an adhesive sheet, an adhesive, or the like. In other words, double-sided substrate 10 is connected to bottom plate 30 so as to be along bottom plate 30. An opening 31 is provided in a center portion of bottom plate 30 so that two terminals 11 and 12 are exposed from above. Four connection units 33 (33a, 33b, 33c, and 33d) are formed at four sides of bottom plate 30. Each connection unit 33 is formed in a portion within the upper surface of double-sided substrate 10 of bottom plate 30 and has an L-shaped section. Each connection unit 33 is formed such that an outside surface of connection unit 33 comes into contact with an inside surface of a side portion of frame 20. Bottom plate 30 is positioned at a longer distance from vibrator 80 than from coil 40. That is, bottom plate 30 covers vibrator 80, coil 40, and the like as well as frame 20.

In the present embodiment, bottom plate 30 is made of nonmagnetic materials. Bottom plate 30 is made of nonmagnetic metallic materials, for example, nonmagnetic stainless steel. Bottom plate 30 may not be limited to an article made of metallic materials but be an article made of resin, for example.

Frame 20 has a rectangular parallelepiped shape, in which a bottom portion is open, as a whole. Frame 20 is formed by performing a reduction process on an iron plate. When viewed from above, corners (portions between sides) of frame 20 are connected with a R-surface portion interposed therebetween. As illustrated in FIG. 2, frame 20 is arranged in such a manner as to cover the upper surface of double-sided substrate 10 from above double-sided substrate 10. Frame 20 is fixed to bottom plate 30 in such a manner that an inside surface at each side wall thereof is in contact with a side surface of each connection unit 33 of bottom plate 30 and thus each side wall is bonded or welded to each connection unit 33. In other words, bottom plate 30 is attached to frame 20. Frame 20 may be fixed to bottom plate 30 in a manner of being fitted into connection units 33 or in another manner.

Thus, because vibration generator 1 is structured in a manner to be surrounded by frame 20, vibration generator 1 is nearly unlikely to be influenced by the surrounding magnetic field, etc. Magnetic flux in vibration generator 1 is difficult to leak outside, and thus the magnetic flux is difficult to influence external apparatus, circuits, and the like.

Since vibration generator 1 is surrounded by frame 20 and bottom plate 30, in a box shape, the rigidity of vibration generator 1 itself is high. Therefore, vibration generator 1 can certainly generate a vibration. Vibration generator 1 is easy to handle at the time of attachment work, i.e., when vibration generator 1 is attached to an external instrument or the like.

Coil 40 is a plate-like air core coil which is formed by winding an electrical wire, for example, and coil 40 has an elliptical form as a whole. That is, coil 40 is a thin coil where a size in a direction of a winding axis is smaller than a size in a direction orthogonal to the direction of the winding axis. Coil 40 may be obtained by slicing a metallic foil-wound object, or by laminating sheet coils. Coil 40 may have a round shape or a polygonal shape, such as quadrangle shape in a plan view.

As illustrated in FIG. 2, coil 40 is arranged on the upper surface of bottom plate 30 in a posture such that the direction of the winding axis is a vertical direction. As illustrated in FIG. 1, when viewed from above, coil 40 is disposed in a center portion of vibration generator 1 and arranged in a face-to-face manner with respect to vibrator 80 as described below. Coil 40 and bottom plate 30 are electrically insulated from each other. Two winding ends of coil 40 are both wired to extend through opening 31 from the inner side of coil 40 and to reach the upper surface side of double-sided substrate 10, and are connected to terminals 11 and 12.

Holder 50, magnet 60, and yoke 70 are integrally molded by insert molding. That is, holder 50 and vibrator 80 are integrally molded. In the first embodiment, pillar body 51, arm 53, and retention unit 55 are integrally molded using an elastic material (an example of the resin). For example, heat-resistant fluorine rubber or silicon rubber can be used as the elastic material. Holder 50 is made of the rubber, which allows a heat resistance property of vibration generator 1 to be enhanced. The elastic material is not limited to the rubber, but various materials may be used as the elastic material.

[Structure of Holder 50 and Vibrator 80]

Figure 3:
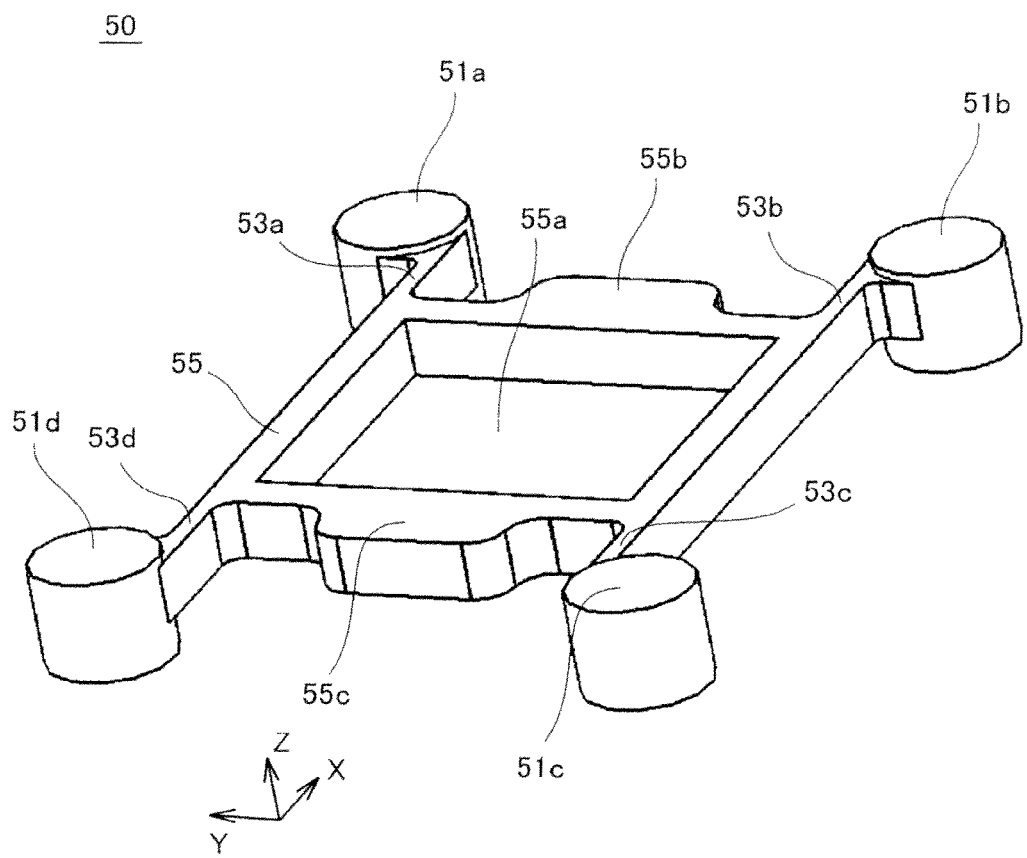
FIG. 3 is a perspective view illustrating a holder.

FIG. 3 is a perspective view illustrating holder 50.

Holder 50 illustrated in FIG. 3 is in a state in which magnet 60 and yoke 70 are not attached to retention unit 55.

That is, although holder 50 is integrally molded with vibrator 80 which includes magnet 60 and yoke 70 in the present embodiment, as for this portion, vibrator 80 is not illustrated but only holder 50 constituted by an elastic body is illustrated in FIG. 3.

Each pillar body 51 has a cylindrical shape where a height direction is the vertical direction. A height of each pillar body 51 is slightly smaller than the size of the inside space of frame 20 in the vertical direction.

As illustrated in FIG. 1, four pillar bodies 51 are disposed at four corners of holder 50 when viewed from above. Each pillar body 51 is disposed in the R-surface portion of the side surface of frame 20.

As illustrated in FIGS. 1 and 2, vibrator 80 has a plate shape parallel to the horizontal plane (an XY-plane in FIG. 1). Vibrator 80 is formed into a substantially rectangular shape, in which each side is parallel to the front-back direction or the crosswise direction, when viewed from above.

As illustrated in FIG. 1, vibrator 80 is disposed in the central portion of holder 50, namely the central portion of vibration generator 1 when viewed from above. As illustrated in FIG. 2, vibrator 80 is disposed in substantially parallel to coil 40 while the surface of vibrator 80 is opposite the surface of coil 40.

Magnet 60 is a permanent magnet and has a thin rectangular parallelepiped shape. For example, in magnet 60, a bottom portion facing coil 40 is magnetized into two poles such that an N pole and an S pole may be formed in front and back portions. Yoke 70 is a rectangular magnetic plate when viewed from above and is attached in a manner to cover the upper surface of magnet 60. The upper surface of yoke 70 is disposed to face the inside of the upper surface of frame 20. Yoke 70 has handle portions 71 and 72 partially projected from left and right sides thereof, respectively. Yoke 70 and magnet 60 are joined, for example, by spot welding or with an adhesive to make up a piece of vibrator 80. Vibrator 80 and holder 50 are integrally molded through insert-molding in the state where yoke 70 and magnet 60 are joined. The upper surface of yoke 70 is provided with protruding portions 75a and 75b.

As illustrated in FIG. 3, retention unit 55 has a quadratic frame shape having a substantially rectangular hole 55a in which vibrator 80 is arranged. Here, retention unit 55 is provided with two bulging-out portions 55b and 55c which bulge leftward and rightward from both sides of retention unit 55. As illustrated in FIG. 2, yoke 70 is disposed together with magnet 60 in a manner that handle portions 71 and 72 are buried in bulging-out portions 55b and 55c, respectively. Owing to this structure, vibrator 80 is difficult to be detached from retention unit 55.

Four arms 53 connect corners of retention unit 55 to pillar bodies 51 nearest to the corners, respectively. Each arm 53 is formed in the shape of a beam extending in a left-and-right direction. As illustrated in FIG. 2, the size of each arm 53 in a widthwise direction (forward-and-rearward direction) is smaller than the size in a longitudinal direction (up-and-down direction). Since each arm 53 is an elastic body, each arm 53 easily bends in the forward-and-rearward direction. The relation between the size in the widthwise direction and the size in the longitudinal direction of each arm 53 is not limited to this. In each arm 53, the size in the widthwise direction may be equal to the size in the longitudinal direction or larger than the size in the longitudinal direction.

Thus, each of four arms 53 is formed to more easily bend in a back and forth direction, which allows vibrator 80 to be displaced mainly in a back and forth direction with respect to pillar body 51. Namely, vibrator 80 is supported by arms 53 such that it can be displayed in a direction substantially parallel to a horizontal surface.

Four pillar bodies 51 of holder 50 are fixed to frame 20, whereby holder 50 is attached to frame 20. Therefore, the basic structure of vibration generator 1 is formed such that vibrator 80 is supported by holder 50, which is integrally molded separately from frame 20, while being able to be displaced with respect to frame 20.

In vibration generator 1, coil 40 generates the magnetic field for causing vibrator 80 to reciprocate with respect to frame 20. That is, when an electric current flows through coil 40, coil 40 is magnetized and a magnetic field in the up-and-down direction is generated. When the magnetic field is generated, magnet 60 is influenced by this magnetic field, generating a repulsive/attractive force. According to the direction of the magnetic field and the arrangement of the magnetic poles of the magnet 60, a force of displacing vibrator 80 forward or rearward acts on vibrator 80. Therefore, vibrator 80 is displaced to either the forward direction or the rearward direction, letting each arm 53 bend flexibly. Therefore, when an alternating current is transmitted to coil 40, vibrator 80 performs reciprocating linear motion in the forward-and-rearward direction with respect to frame 20 when viewed from above according to the alternating current. Thereby, vibration generator 1 generates vibration force.

When the current value of the alternating current decreases, the magnetic field becomes weak, or the magnetic field is lost, vibrator 80 tries to return to the center portion of vibration generator 1 when viewed from above, due to restoring force of arm 53. At this time, since arm 53 is an elastic body, the energy consumed by arm 53 is comparatively large. Therefore, the vibration is promptly attenuated.

In this embodiment, since bottom plate 30 is made of nonmagnetic materials, the magnetic attractive force of magnet 60 is not generated between vibrator 80 and bottom plate 30. Vibrator 80 is smoothly and efficiently displaced according to the magnetic field generated by coil 40. Therefore, vibration generator 1 can be thinned and can be properly operated.

[Attachment Structure for Attaching Holder 50 to Frame 20]

In the first embodiment, pillar body 51 engages an engaging unit 21 (21*a*, 21*b*, 21*c*, and 21*d*) provided in frame 20, thereby attaching pillar body 51 to frame 20. Therefore, holder 50 is configured to be able to be easily attached to frame 20.

Figure 4:
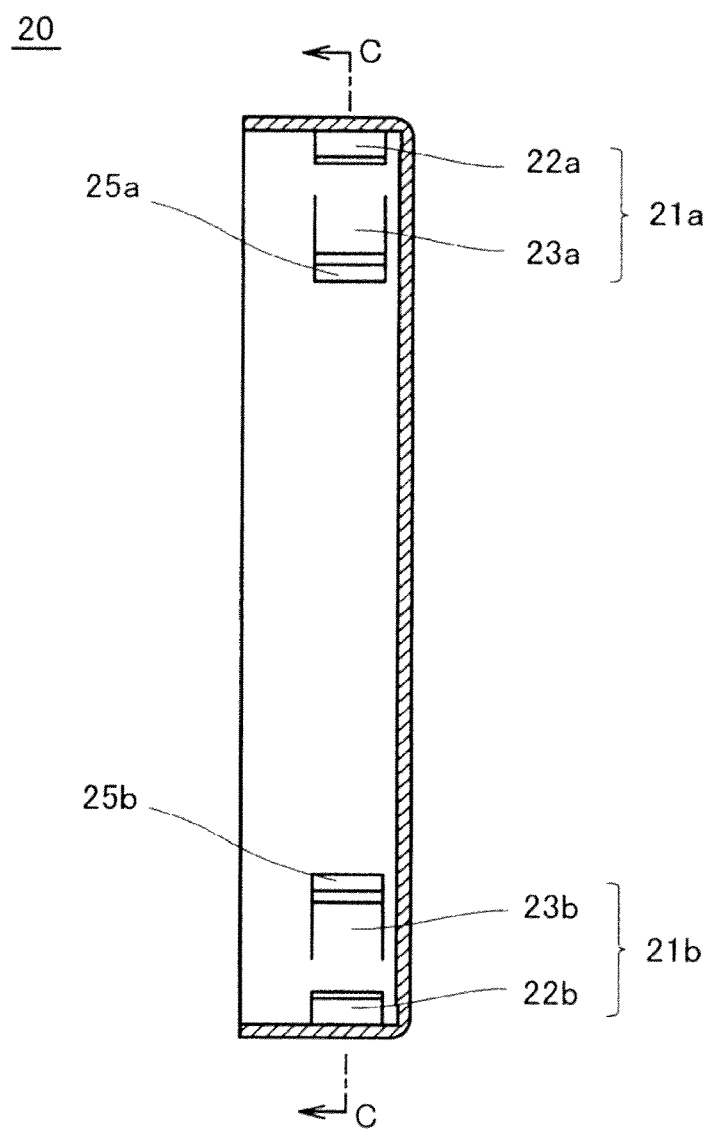
FIG. 4 is a cross-sectional view of a frame taken along a line B-B of FIG. 1.
Figure 5:
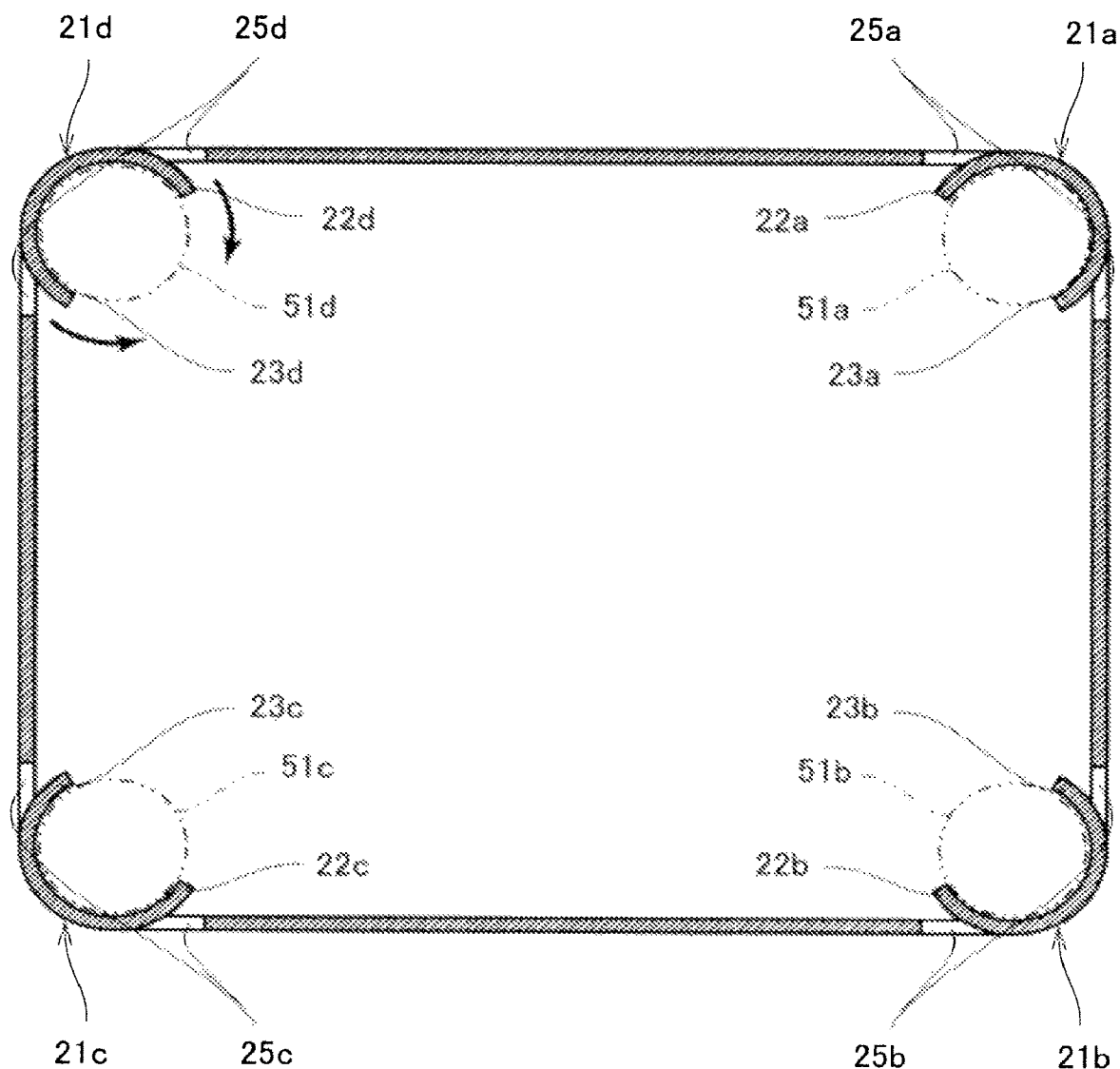
FIG. 5 is a sectional view of the frame taken along a line C-C of FIG. 4.

FIG. 4 is a sectional view of frame 20 taken on a line B-B of FIG. 1. FIG. 5 is a sectional view of frame 20 taken on a line C-C of FIG. 4.

In the first embodiment, as illustrated in FIG. 5, engaging units 21 are provided in the corner portions of frame 20 when viewed from above. Each of four engaging units 21 includes two claws 22 and 23, namely, a first claw 22 (22*a*, 22*b*, 22*c*, and 22*d*) and a second claw 23 (23*a*, 23*b*, 23*c*, and 23*d*).

As illustrated in FIG. 4, a U-shape notch is partially provided in the side surface of frame 20, and an interior portion of the notch is pressed into the inside of frame 20, thereby forming each of claws 22 and 23 of engaging unit 21. Accordingly, claws 22 and 23 and frame are integrally molded. Each of claws 22 and 23 is formed in the above manner to partially provide a gap 25 (25*a*, 25*b*, 25*c*, and 25*d*) in the side surface of frame 20.

In the first embodiment, claws 22 and 23 are formed into the shape corresponding to the shape of pillar body 51. That is, because pillar body 51 has the columnar shape, claws 22 and 23 are formed into the shape along a side circumferential surface of pillar body 51. As illustrated in FIG. 5, when viewed from above, each engaging unit 21 is formed such that at least a semicircle of the outer circumference surface of pillar body 51 disposed in engaging unit 21 is surrounded by claws 22 and 23 and the R-surface portion between the side surfaces of frame 20.

In the case that holder 50 is disposed in frame 20, four pillar bodies 51 are fitted in four engaging units 21. Therefore, each pillar body 51 is held between claws 22 and 23 of engaging unit 21. In other words, in each pillar body 51, the side circumferential surface is gripped by claws 22 and 23 of engaging unit 21. Pillar body 51 and engaging unit 21 engage each other to fix pillar body 51 to frame 20, thereby attaching holder 50 to frame 20.

Each of claws 22 and 23 is fixed to corresponding pillar body 51 in a caulking manner in a state in which pillar bodies 51 are fitted in engaging units 21, respectively. As illustrated by an arrow of FIG. 5, for example, a first claw 22*d* is pushed forward (lower side in FIG. 5) to be inserted into, for example, engaging unit 21*d*, and a second claw 23*d* is pushed rightward (right side in FIG. 5) to be inserted into engaging unit 21*d*. Thus, by caulking of claws 22 and 23, claws 22 and 23 bite into respective pillar bodies 51, which allows pillar bodies 51 to be more firmly fixed to frame 20.

In the vibration generator in the background art, the vibrator is supported using the plate spring attached to the chassis. For example, in the vibration generator in which the plate spring is attached to the chassis using the screw, unfortunately the structure of the portion in which the plate spring is attached onto the chassis side becomes complicated. Therefore, the assembly man-hour of the vibration generator increases, and the number of components also increases, which increases the production cost of the vibration generator. The problem becomes more prominent with increasing demand for the downsizing and the low profile of the vibration generator. That is, because the downsizing of the component advances with the downsizing of the vibration generator, it is necessary to adopt attachment methods, such as the spot welding, instead of the screw clamp or caulking, and the structure of the attachment portion between the components becomes complicated. For example, in the case that the spot welding is performed to the attachment portion of the plate spring and the chassis, the region where the spot welding is performed becomes brittle against the impact force. Therefore, it is necessary to perform the spot welding at many points in order to maintain high reliability of the vibration generator, and sometimes it takes a lot of trouble with the production. The problem with the method for joining the spring unit and the chassis is not originally generated in the vibration generating device in the background art that has the structure in which the spring unit and the frame are integrally molded. However, in this case, unfortunately the material used for the chassis is restricted to a material, which can be molded while being integral with the spring unit.

On the other hand, in the first embodiment, holder 50 including pillar body 51 is integrally molded, and pillar body 51 is fitted in engaging unit 21 to attach holder 50 to frame 20. Holder 50 can easily be attached to frame 20, and the number of components is suppressed to a low level, so that the production cost of vibration generator 1 can be reduced. Because each holder 50 and frame 20 is integrally formed, the attachment portion of holder 50 and frame 20 does not become brittle. Accordingly, the reliability of vibration generator 1 can be enhanced against the impact. It is not necessary to attach holder 50 to frame 20 using other members, such as the screw, so that the downsizing, low profile, weight reduction of vibration generator 1 can be implemented.

In the structure of the background art in which the spring unit supporting the vibrator and the chassis are integrally molded using resin, unfortunately it is necessary that the spring unit and the chassis be made of the same material for the viewpoint of material selection. However, in the first embodiment, the number of components decreases because holder 50 and frame 20 are constructed by different members. While holder 50 and frame 20 have the simple structures that can easily be assembled, the material for frame 20 can properly be selected. Accordingly, frame 20 can be configured to exert its function without separately providing a member that acts as a magnetic circuit or a magnetic shield.

In holder 50, pillar body 51, arm 53, and vibrator retention unit 55 are integrally molded using the elastic material. Accordingly, the number of components decreases, and holder 50 can easily be produced. In the first embodiment, magnet 60 and yoke 70 are formed by the insert molding together with holder 50. Accordingly, holder 50 can easily be constructed while retaining vibrator 80, and a production process of vibration generator 1 can be simplified.

Engaging unit 21 and frame 20 are integrally formed such that claws 22 and 23 are formed while the notch is partially provided in the side surface of frame 20. Accordingly, the number of components can decrease to reduce the production cost.

In the attachment structure of holder 50 to frame 20, columnar pillar body 51 is gripped by two claws 22 and 23. Accordingly, while the structure of vibration generator 1 is simplified, pillar body 51 is surely positioned in frame 20, and accuracy of the attachment of holder 50 to frame 20 can be enhanced. Because of the structure in which claws 22 and 23 are caulked with respect to pillar body 51, holder 50 is strongly attached to frame 20.

The attachment structure for attaching vibrator 80 to holder 50, i.e., the attachment structure for attaching magnet 60 and yoke 70 to holder 50 is not limited to an article prepared through insert molding. For example, magnet 60 and yoke 70 which are mutually joined through welding or the like are incorporated into holder 50, and bonded. Alternatively, holder 50 and yoke 70 may be integrally formed and thereafter magnet 60 may be attached to yoke 70.

[Structure of Yoke 70]

Vibrator 80 moves in response to the influence of the magnetic field generated by the coil arranged under vibrator 80. Vibrator 80 is displaced in an up-and-down direction, or tilted from a horizontal surface. (In this sense, the movement of vibrator 80 is not performed strictly within the level surface. However, the quantity of the displacement of vibrator 80 in the up-and-down direction or the quantity of the change in the posture is comparatively small. Therefore, hereinafter the movement of vibrator 80 may be expressed as "move laterally" in a macroscopic sense.) In the case where force is applied to vibration generator 1 from the outside, vibrator 80 may be displaced to frame 20 in the up-and-down direction. Vibration generator 1 has a thin structure and an interval between frame 20 and the upper surface of vibrator 80 is comparatively narrow. Therefore, when vibrator 80 is displaced with respect to frame 20 in the up-and-down direction or tilted to frame 20 in this way, the upper surface of vibrator 80 may come into contact with the inside of the upper surface of frame 20.

In the present embodiment, when vibrator 80 is displaced in the up-and-down direction or tilted to frame 20, two protruding portions 75a and 75b within the upper surface of yoke 70 may come into contact with frame 20.

As illustrated FIG. 1, protruding portions 75a and 75b are provided such that they may protrude toward the inside of the upper surface of frame 20 from the upper surface of yoke 70. Protruding portions 75a and 75b are provided in two positions which are mutually symmetrical to each other with respect to a plane (plane which is parallel to a ZX plane), which is perpendicular to the forward-and-rearward direction as a movement direction of vibrator 80, the plane passing through the center of vibrator 80. Protruding portions 75a and 75b are located in two positions on a plane which is parallel to a YZ plane and passes the center of vibrator 80. That is, in the present embodiment, protruding portion 75a is provided in a rear side at a left-and-right direction center portion within the upper surface of vibrator 80. Protruding portion 75b is provided in a front side at the left-and-right direction center portion within the upper surface of vibrator 80, i.e., in a position symmetrical with protruding portion 75a.

Figure 6:
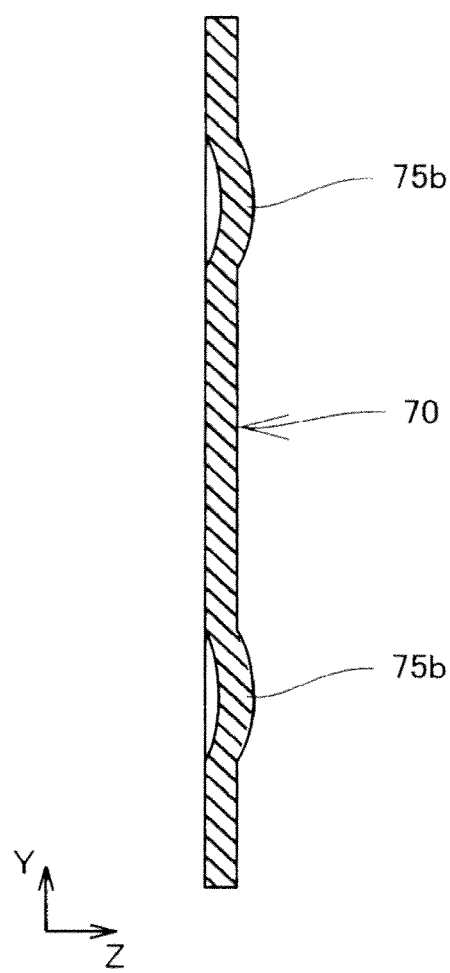
FIG. 6 is a cross-sectional side view of a yoke taken along a line B-B of FIG. 1.

FIG. 6 is a cross-sectional side view of yoke 70, taken along a line B-B of FIG. 1.

As illustrated in FIG. 6, in the present embodiment, each of protruding portions 75a and 75b has a curved surface shape which is convex upward (right side in FIG. 6). In other words, when each of protruding portions 75a and 75b has a convex curved surface which is convex towards the inside of the upper surface of frame 20. The surface shape of each of protruding portions 75a and 75b is, for example, a substantially spherical shape (i.e., an approximately arc shape in the section illustrated in FIG. 6). Each of protruding portions 75a and 75b is formed through press working or steel metal working such that they are pressed to protrude upward from plate-like yoke 70. That is, each of protruding portions 75a and 75b is integrally formed with other portions of yoke 70. Each of protruding portions 75a and 75b is not limited to this structure. For example, each of protruding portions 75a and 75b may be provided in a manner that members which are separated from the body of yoke 70 are attached to the upper surface of yoke 70. Each of protruding portions 75a and 75b may be formed by applying liquid members (for example, epoxy-based resin material, molten metal, etc.) to the upper surface of yoke 70, and curing or solidifying the liquid members.

Thus, since protruding portions 75a and 75b are provided within the upper surface of yoke 70 in the present embodiment, even when vibrator 80 approaches frame 20, protruding portions 75a and 75b come into contact with frame 20 first. Since the portion that comes into contact with frame 20 is restricted to protruding portions 75a and 75b, the area in contact with frame 20 is also restricted. Therefore, when protruding portions 75a and 75b among portions of vibrator 80 come into contact with frame 20, a frictional force which acts on vibrator 80 is decreased, reducing the influence on the operation of vibrator 80. Vibration generator 1 which can properly operate can be thinned. Since the frictional force which acts on vibrator 80 can be reduced, power consumption of vibration generator 1 can be reduced. It is possible to prevent inhibition of the operation of vibrator 80 attributable to an event that vibrator 80 comes into contact with frame 20, and vibrator 80 can be operated smoothly.

Protruding portions 75a and 75b are symmetrically arranged with respect to the movement direction (vibrating direction) of vibrator 80. Therefore, when vibrator 80 comes into contact with frame 20 at the time of vibration of vibrator 80, protruding portions 75a and 75b certainly come into contact with frame 20, and other portions of vibrator 80 are difficult to come into contact with frame 20. Therefore, the influence on the operation of vibrator 80 by an event that vibrator 80 comes into contact with frame 20 can be certainly reduced.

Since each of protruding portions 75a and 75b has a spherical surface shape which is convex toward the inside of the upper surface of frame 20, each of protruding portions 75a and 75b and frame 70 comes into point contact with each other. Therefore, the frictional force which acts on vibrator 80 can be certainly decreased, and thus vibrator 80 can be reliably operated.

Modification of First Embodiment

Vibration generator 1 may include a substrate and a bottom plate having a structure different from double-sided substrate 10 and bottom plate 30 instead of double-sided substrate and bottom plate 30.

Figure 7:
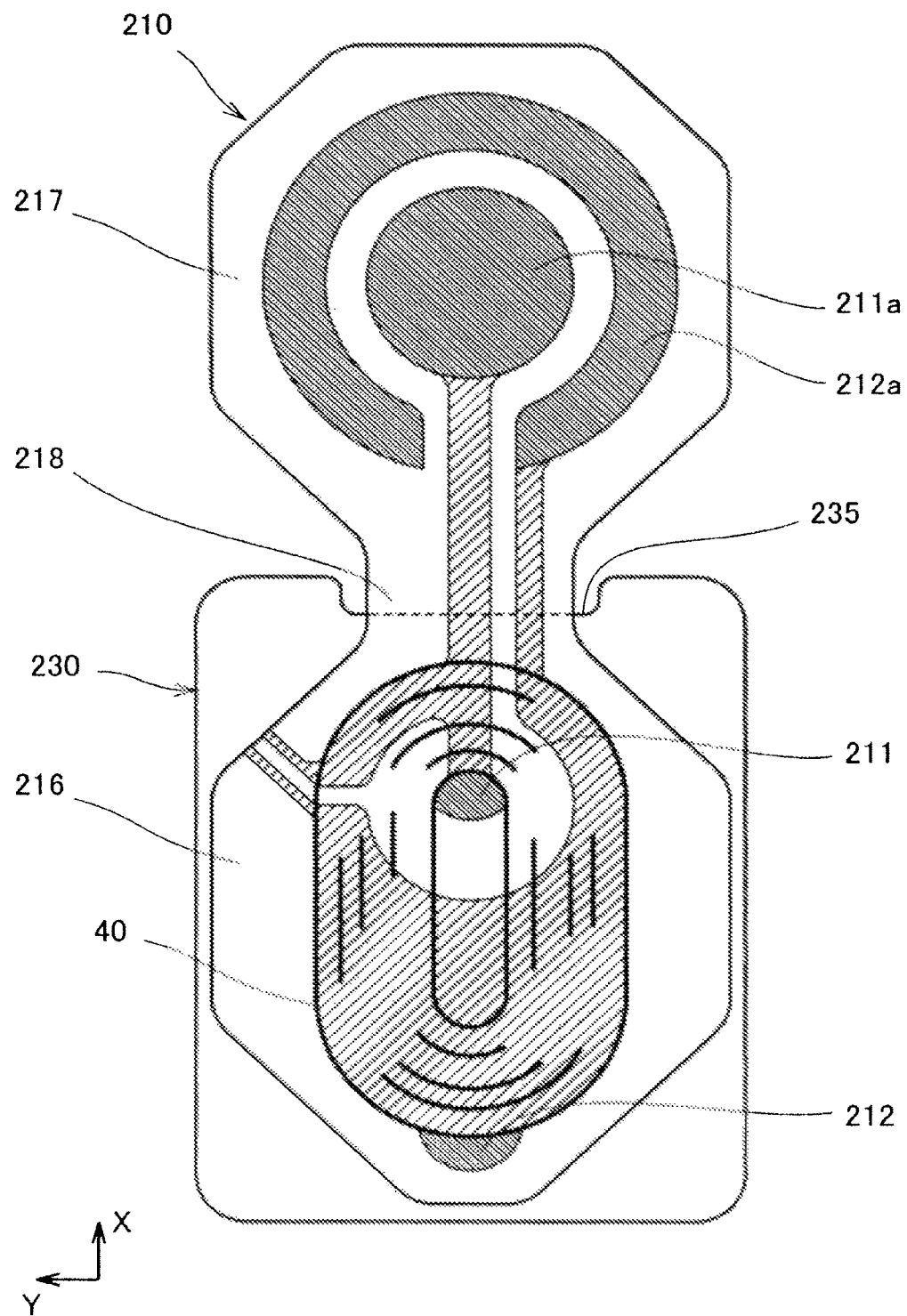
FIG. 7 is a development view illustrating a substrate and a bottom plate according to one modification of the first embodiment.

FIG. 7 is a development view illustrating a substrate 210 and a bottom plate 230 according to one modification of the first embodiment.

Substrate 210 is a Flexible Printed Circuit board (FPC), and is arranged in such a manner that bottom plate 230 is inserted in substrate 210. In other words, substrate 210 is arranged to partially cover both surfaces of bottom plate 230. In FIG. 7, substrate 210 is expanded in the form of plane.

Bottom plate 230 has a flat plate shape. Bottom plate 230 is inserted from the bottom side of frame 20, and fixed to frame 20. Referring to FIG. 7, a notch portion 235 is provided in a portion (an example of a portion of an edge portion) located in an upper portion among edge portions of bottom plate 230. Because of this structure, the inside and the outside of vibration generator 1 communicate with each other through the notch portion 235 in a state where bottom plate 230 is fixed to frame 20.

Bottom plate 230 is made of nonmagnetic materials, for example, nonmagnetic stainless steel. Since vibration generator 1 is surrounded by frame 20 and bottom plate 230 which are metallic materials, vibration generator 1 can be more easily handled, and the durability of vibration generator 1 is raised.

Substrate 210 has an upper surface portion 216 arranged along the upper surface of bottom plate 230 and a bottom surface portion 217 arranged along the bottom surface of bottom plate 230. A portion between upper surface portion 216 and bottom surface portion 217 serves as a folded portion 218. Upper surface portion 216 is arranged to be interposed between a coil 40 and bottom plate 230. In folded portion 218 located in notch portion 235, substrate 210 is folded such that bottom surface portion 217 of substrate 210 is along the bottom surface of bottom plate 230. Substrate 210 is bonded and fixed to bottom plate 230 etc., for example.

As illustrated in FIG. 7, two pads 211 and 212 are provided in upper surface portion 216 of substrate 210, and two pads 211a and 212a are provided in bottom surface portion 217 of substrate 210. Pads 211 and 211a are connected to each other with a wiring pattern so as to be at the same electrical potential and pads 212 and 212a are connected to each other with a wiring pattern so as to be at the same electrical potential. A winding end of coil 40 is connected to pads 211 and 212 provided in upper surface portion 216. Pads 211a and 212a provided in bottom surface portion 217 serve as electrodes when vibration generator 201 is mounted on a circuit or the like.

Thus, with the use of substrate 210 which is an FPC, as compared with the case where a double-sided substrate is used, the size of vibration generator 1 in the up-and-down direction can be reduced. Furthermore, the shape of bottom plate 230 can be simplified.

Since notch portion 235 is provided in bottom plate 230, substrate 210 is not projected outside from the chassis so that substrate 210 can be certainly protected.

Since bottom plate 230 is made of nonmagnetic materials, even when the interval between vibrator 280 and bottom plate 230 is narrow like in the first embodiment, operation of vibrator 280 is not inhibited. Therefore, it is possible to provide thin vibration generator 1 with high durability, thin vibration generator 1 being covered by bottom plate 230 at the bottom thereof.

Second Embodiment

In a second embodiment, an attachment structure for attaching a holder to a frame and an attachment structure for attaching a vibrator, especially a portion related to a yoke, to the holder are different from the first embodiment and the modification thereof.

Figure 8:
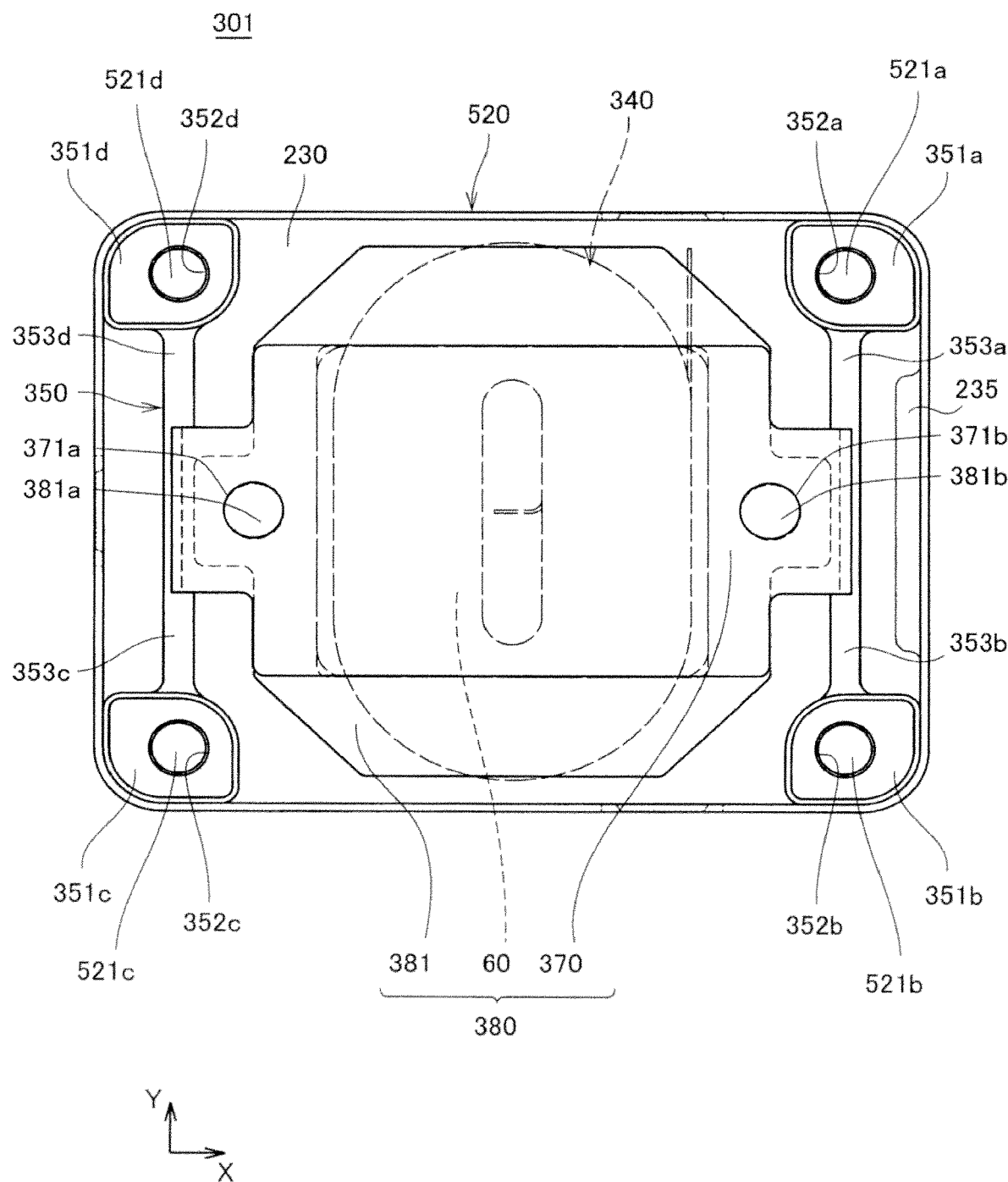
FIG. 8 is a plan view illustrating the configuration of a vibration generator according to a second embodiment.

FIG. 8 is a plan view illustrating the configuration of a vibration generator 301 according to the second embodiment. FIG. 9 is a cross-sectional side view of vibration generator 301 according to the second embodiment.

In FIG. 8, a holder 350 hidden under an upper surface of a frame 520, and the like are illustrated partially in a solid like in FIG. 1. In addition, in FIG. 8, illustration of a flexible printed circuit board is omitted. The structure of the portion which is omitted in illustration is substantially the same as those of the first embodiment and the modification thereof.

Vibration generator 301 differs in the following point from vibration generator 1 of the first embodiment or the modification thereof. That is, vibration generator 301 includes holder 350 instead of holder 50. Vibration generator 301 includes frame 520 instead of frame 20. Other structures of vibration generator 301 are the same as those of vibration generator 1. As a bottom plate, bottom plate 230 illustrated in FIG. 7 is used. As the substrate, a substrate 310 which is an FPC like substrate 210 and has an upper surface portion 316 and a bottom surface portion 317 is used.

Holder 350 is a vibrator-mounted holder retaining a vibrator 380 and is attached to a frame 520. Holder 350 is configured such that a movement direction of vibrator 380 is a left-and-right direction (X-axis direction of FIG. 8).

In the second embodiment, the attachment structure for attaching holder 350 to frame 520 is configured as follows. That is, as illustrated in FIG. 8, holder 350 has four pillar bodies (an example of a fixing unit) 351 (351a, 351b, 351c, and 351d). Pillar bodies 351 are provided in positions corresponding to pillar bodies 51 in holder 50. As pillar bodies 351 are fixed to frame 520 in a manner described below, holder 350 is supported by frame 520.

Holes 352 (352a, 352b, 352c, and 352d) are provided in pillar bodies 351 of holder 350, respectively. Each hole 352 is formed to penetrate through the corresponding pillar body 351, i.e., from the upper surface to the lower surface. Each hole 352 has a cylindrical shape. Each hole 352 is formed such that an up-and-down direction, which is perpendicular to a left-and-right direction, i.e. a movement direction, of a vibrator is a depth direction. In other words, each hole 352 is formed to extend along the up-and-down direction which is almost perpendicular to a plate-like vibrator which is almost substantially horizontally arranged.

Figure 10:
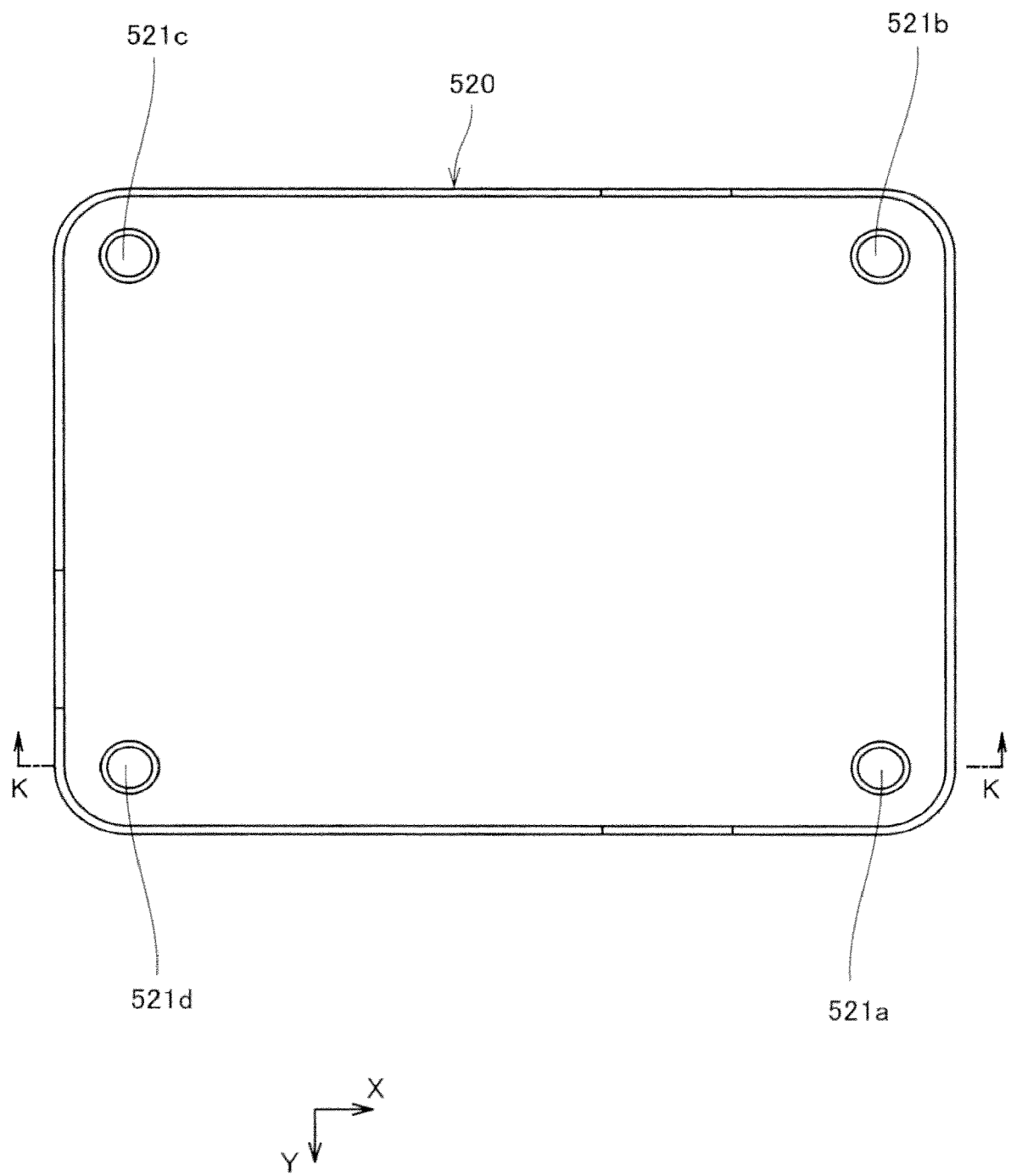
FIG. 10 is a bottom view illustrating a frame according to the second embodiment.
Figure 11:
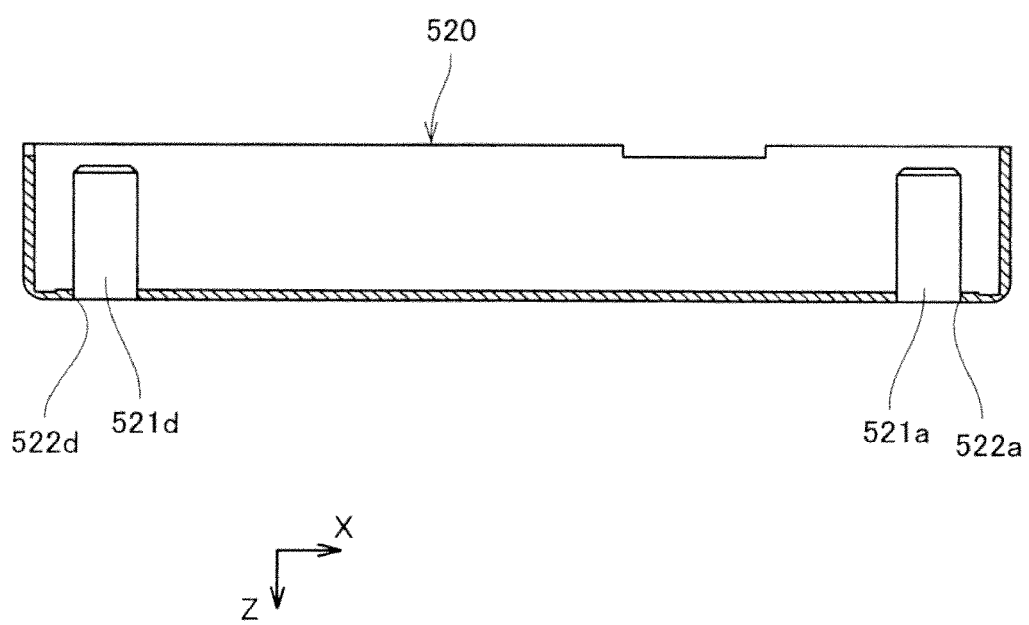
FIG. 11 is a cross-sectional view taken along a line K-K of FIG. 10.

FIG. 10 is a bottom view illustrating frame 520 according to the second embodiment. FIG. 11 is a cross-sectional view taken along a line K-K of FIG. 10.

As illustrated FIG. 10, poles 521 (521a, 521b, 521c, and 521d) are arranged at four corners of frame 520, respectively in a bottom view. Each of four poles 521 is a pin having a cylindrical shape. Poles 521 are arranged in positions corresponding to four holes 352 in holder 350, respectively. As illustrated in FIG. 11, each pole 521 is arranged such that a longitudinal direction thereof becomes the up-and-down direction, i.e., a direction which is perpendicular to the movement direction of the vibrator. Each pole 521 is erected on frame 520 such that upper ends of poles 521 are press-fitted into press-fitting holes 522 (522a, 522b, 522c, and 522d) formed in a top panel (bottom side in FIG. 11) of the body of frame 520, and lower ends of poles 521 protrude downward from the lower surface of the top panel. Each pole 521 protrudes from the top panel of the body of frame 520 by a length which is shorter than the size of pillar bodies 351 in the up-and-down direction. Although each pole 521 is made of, but not limited to, metallic materials, such as iron. For example, each pole 521 may be molded using resin.

Holder 350 is attached to frame 520 in such a manner that poles 521a, 521b, 521c, and 521d are fitted into holes 352, respectively from the upper side. In the state where holder 350 has been arranged on frame 520, bottom plate 230 is arranged on the underside of holder 350. As holder 350 is prevented from being pulled out and being separated from poles 521 in this way, holder 350 remains attached to frame 520. Holder 350 is attached to frame 520 in the state where the magnet and the like are attached beforehand.

In the second embodiment, holder 350 is attached to frame 520 in such a manner that pillar bodies 351 are fitted into poles 521 in this way. Therefore, it is not necessary to provide a notch portion for holding pillar bodies 351 in a side surface of frame 520 unlike the first embodiment. Since it is not necessary to provide holes in frame 520, vibration generator 501 is surrounded with frame 520 and bottom plate 230 to have a sealed structure. Therefore, intrusion of foreign substances, such as dirt and dust into vibration generator 501 can be prevented, and the reliability of vibration generator 501 can be raised. Furthermore, a caulking step, etc. for pillar bodies 351 which are comparatively complicated are not necessary, and holder 350 can be easily attached to frame 520 by fitting poles 521 into holes 352.

An outside circumferential surface of each pillar body 351 is in contact with and along an inside circumferential surface of frame 520 in the state where holder 350 is attached to frame 520. That is, each pillar body 351 is formed in the shape which is along a round-chamfered surface portion and planar surface portions at both sides of the round-chamfered surface portion among portions of the inside circumferential surface of frame 520. Thereby, pillar bodies 351 are in contact with the inside circumferential surface of frame 520 in a relatively wide range in the state where holder 350 is attached to frame 520. Therefore, pillar bodies 351 are certainly retained so that the positions or postures thereof with respect to frame 520 may not change.

Holder 350 has vibrator 380 and arms 353 (353a, 353b, 353c, and 353d) which connect vibrator 380 to respective pillar bodies 351, besides pillar bodies 351 arranged in positions corresponding to respective poles 521 as described above. In holder 350, these portions are integrally molded using resin.

Figure 12:
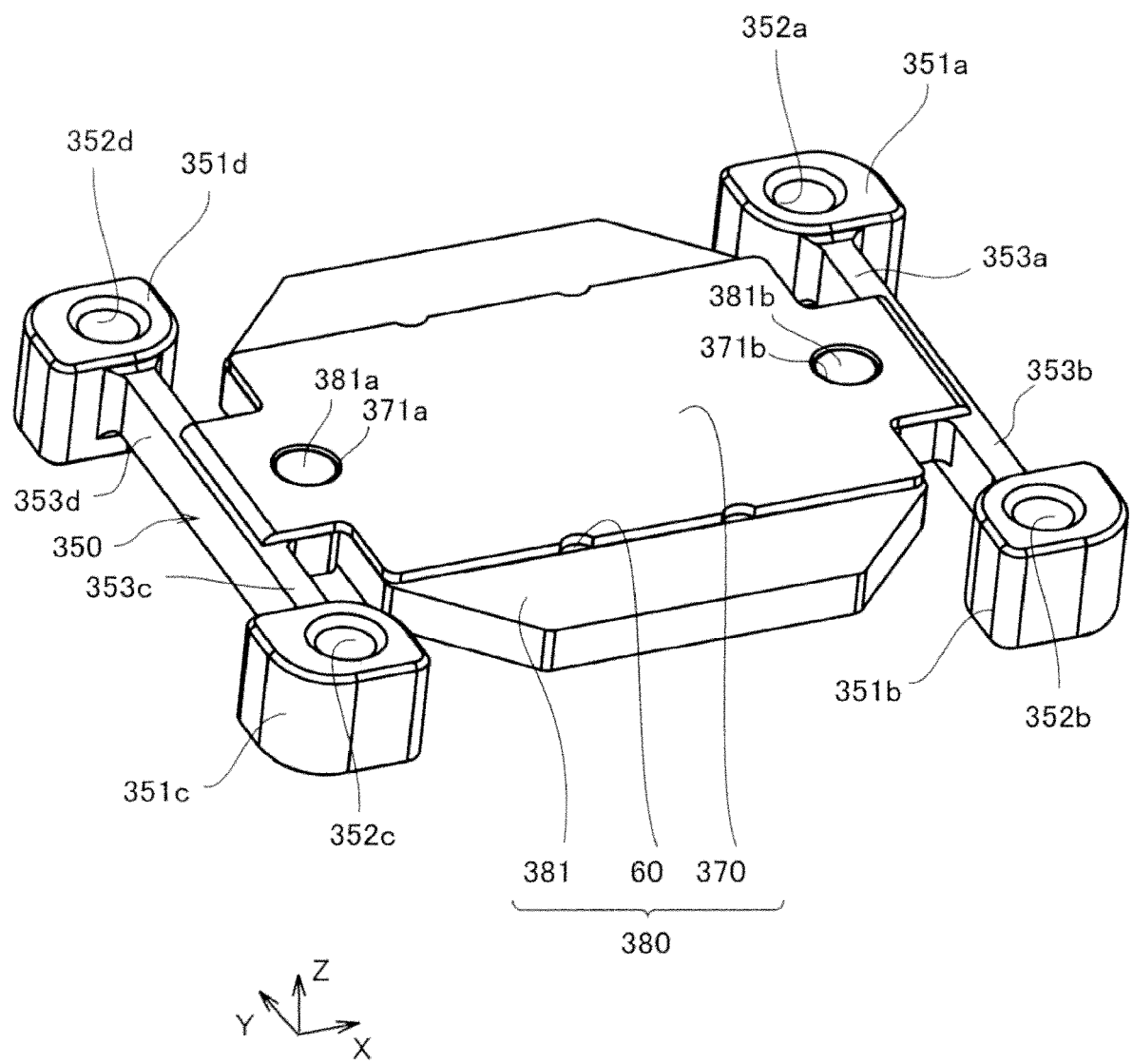
FIG. 12 is a perspective view illustrating a vibrator-mounted holder of the vibration generator.
Figure 13:
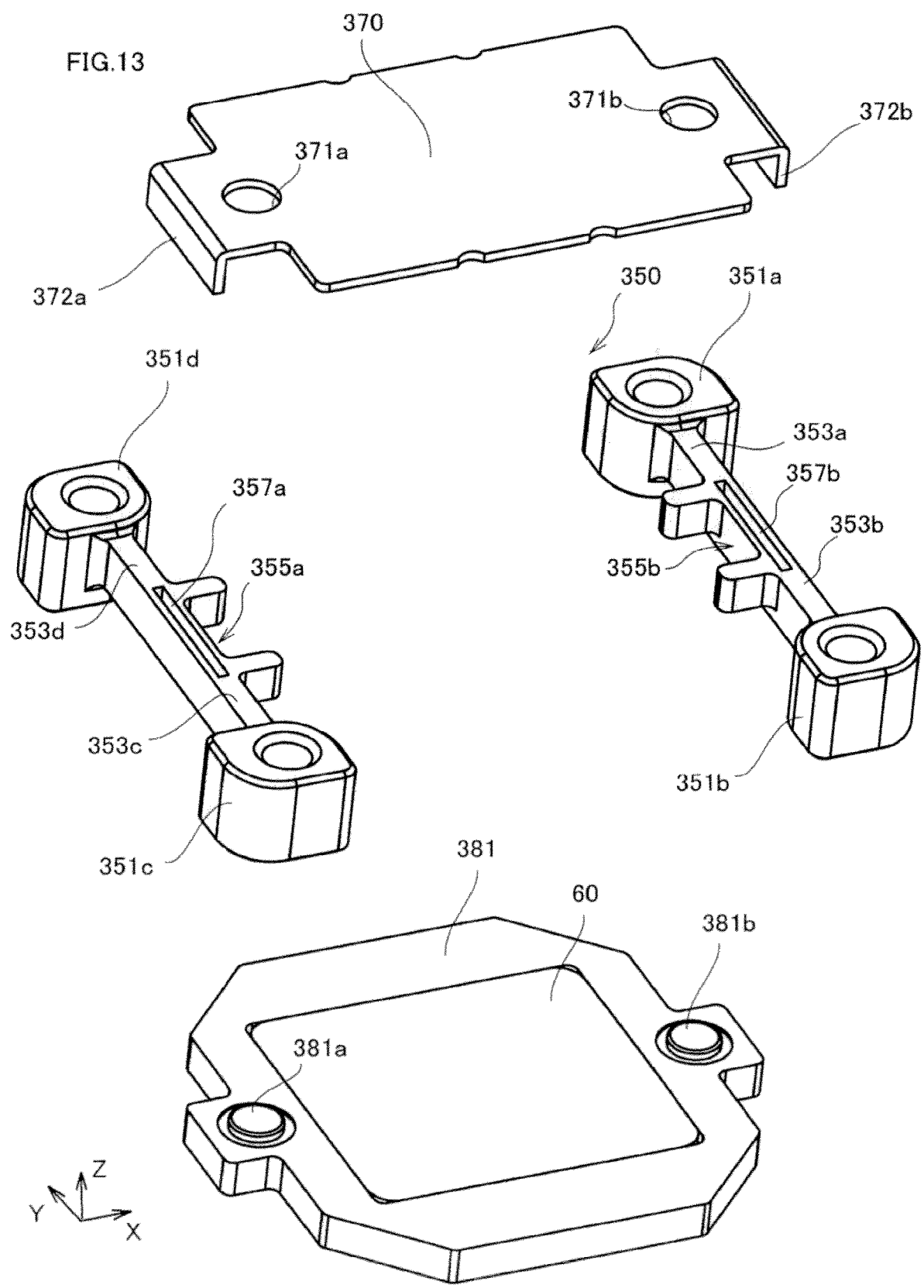
FIG. 13 is an exploded perspective view of FIG. 12.

FIG. 12 is a perspective view illustrating a vibrator-mounted holder of vibration generator 301. FIG. 13 is an exploded perspective view of FIG. 12.

As illustrated in FIG. 12, vibrator 380 includes magnet 60, a yoke 370, and a weight 381. Weight 381 is formed to surround side portions of magnet 60. Yoke 370 is attached to the upper surfaces of magnet 60 and weight 381. Yoke 370 has holes 371a and 371b formed in left and right sides of the yoke. Protrusions 381a and 381b formed to protrude upward from the upper surface of weight 381 are fitted into holes 371a and 371b.

Each arm 353 is formed so that a forward-and-rearward direction becomes a longitudinal direction. That is, arms 353a and 353b are provided between pillar bodies 351a and 351b and a right end portion of vibrator 380, respectively. On the other hand, arms 353c and 353d are provided between pillar bodies 351c and 351d and a left end portion of vibrator 380. As illustrated in FIG. 13, left and right side portions of weight 381 are retained by retention units 355a and 355b made of resin. Retention units 355a and 355b are formed so that side portions of weight 381 may be pinched between front and rear portions of retention units 355a and 355b, respectively. Each arm 353 is connected to retention units 355a and 355b in the side of vibrator 380.

In the second embodiment, left and right ends of yoke 370 are provided with projected portions 372a and 372b which are projected downward. Side edge portions of yoke 370 are bent down at about 90° to form projected portions 372a and 372b, respectively. Recessed portions 357a and 357b which are recessed from the upper surface of retention units 355a and 355a are formed in retention units 355a and 355b, respectively. Recessed portions 357a and 357b are formed in positions corresponding to projected portions 372a and 372b.

Holder 350 and vibrator 380 are integrally molded when holder 350 is molded. That is, in the second embodiment, pillar body 351, arm 353, and retention unit 355 are integrally molded with yoke 370 using resin. Thereby, holder 350 and vibrator 380 can be molded in the state where projected portions 372a and 372b are certainly fitted into recessed portions 357a and 357b. Yoke 370 may be fixed to holder 350 which is molded beforehand through a method such as bonding.

Figure 14:
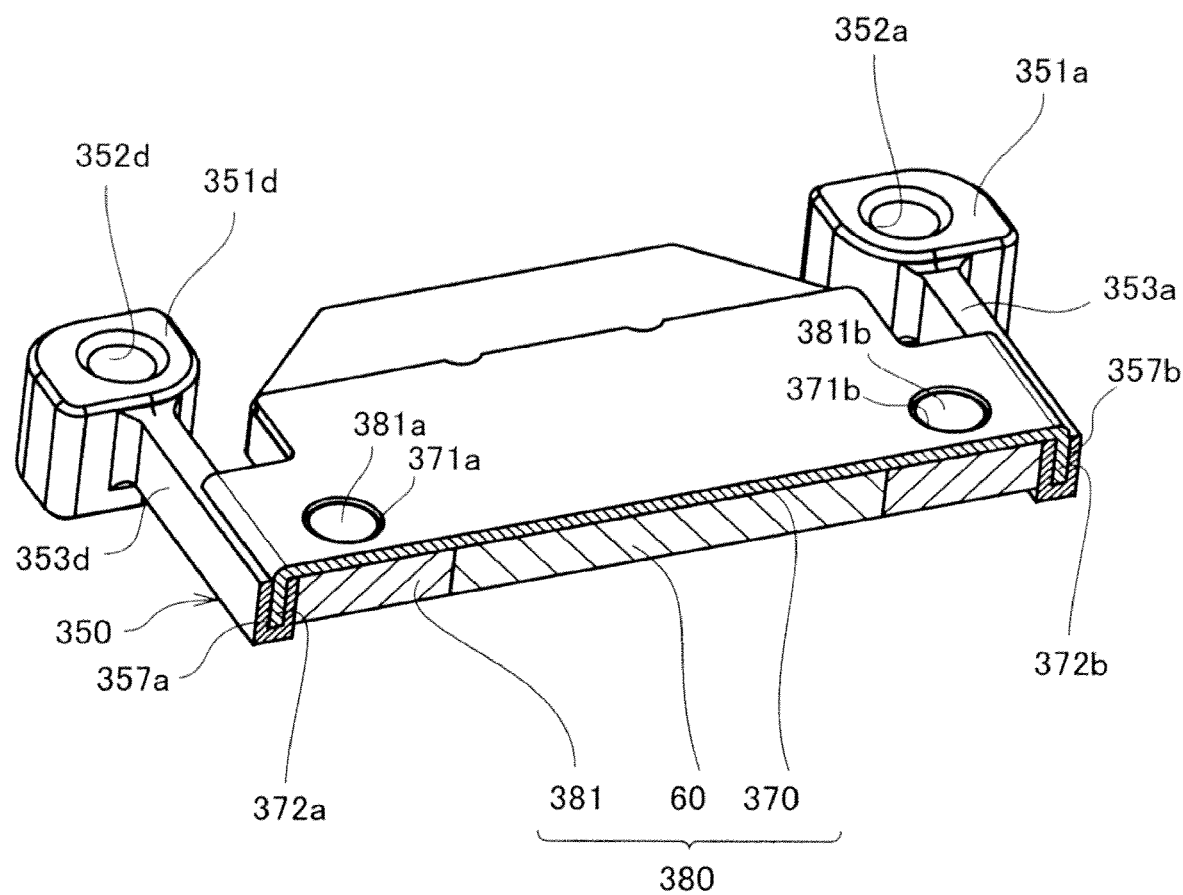
FIG. 14 is a cross-sectional perspective view illustrating an attachment structure by which a yoke is attached to the holder.

FIG. 14 is a cross-sectional perspective view illustrating an attachment structure for attaching yoke 370 to holder 350.

As illustrated in FIG. 14, almost entire parts of projected portions 372a and 372b except for boundary portions at which they are bent are buried in recessed portions 357a and 357b. In other words, retention units 355a and 355b are formed to encase almost the entire part of projected portion 372a and 372b.

Figure 15:
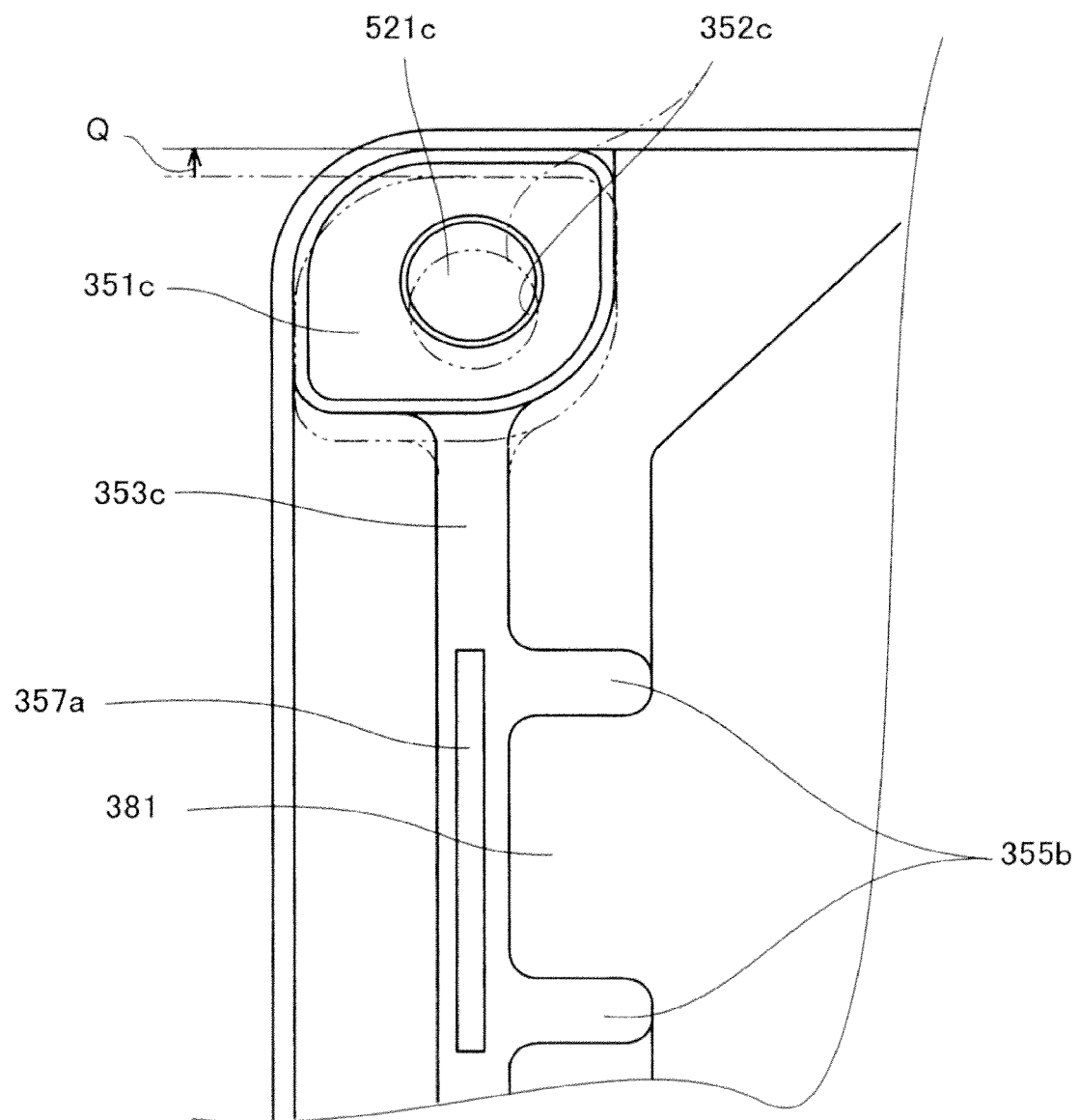
FIG. 15 is an explanatory view describing the configuration of the holder of the vibration generator according to the second embodiment.

FIG. 15 is an explanatory view describing the configuration of holder 350 of vibration generator 301 according to the second embodiment.

In FIG. 15, one arm 353c in the bottom view of vibration generator 301 is illustrated in an expanded manner.

In holder 350 of a natural state (for example, state where holder 350 is not attached to frame 520), a distance between pillar body 351a and pillar body 351b is smaller than a distance between the medial axes of poles 521a and 521b. In addition, in the natural state, a distance between pillar body 351c and pillar body 351d is smaller than a distance between the medial axes of poles 521c and 521d. Therefore, as indicated by an arrow Q in FIG. 15, when holder 350 is attached to frame 520, each arm 353 is extended a little longer in the longitudinal direction than that in the natural state. Namely, each arm 353 switches to the state where it is elastically deformed to be extended from the natural state where holder 350 is attached to frame 520.

In holder 350 mounted with vibrator 380, since each arm 353 is attached to frame 520 in the state where each arm 353 is extended from the natural state, holder 350 experiences tension due to restoring force of four arms 353. A spring force F generated due to each arm 353 is a value obtained by multiplying a displacement x by a spring constant k of arm 353. Since the vectors of restoring forces differ, vibration generator 301 is stable as vibration generator 301 is pulled by arms 353, and is in the state where there is no redundant space. Thereby, when a magnetic attractive force acts on vibrator 380, vibrations can be promptly generated by vibration generator 301 in response to the displacement of vibrator 380, and thus the response for vibration generation is raised.

Here, suppose a case where projected portions 372a and 372b are not formed in yoke but the yoke is just placed on retention units 355a and 355b. In this case, if arm 353 is extended when holder 350 is attached to frame 520, the position of vibrator 380 may be shifted to the coil side (lower side). This problem occurs due to a difference in an extension amount of each of retention units 355a and 355b between an upper portion (side to which yoke 370 is bonded) and a lower portion (side to which yoke 370 is not bonded) of each of retention units 355a and 355b to which arms 353 are connected.

On the other hand, in the second embodiment, as described above, as projected portions 372a and 372b are arranged to be buried in retention units 355a and 355b, and each arm 353 is connected to this portion. In this way, by bending the end of yoke 370 and fixing the periphery of the end of yoke 370 with rubber, the fixed state at the upper portion and the fixed state at the lower portion of each of retention units 355a and 355b are the same. In this way, if the fixed state is almost the same between the upper portion and lower portion of each of retention units 355a and 355b, extension rates thereof become almost equal. Accordingly, even though arms 353 are pulled to be attached to frame 520, upper and lower positions of vibrator 380 do not change. For this reason, vibrator 380 and coil 340 are not likely to come into contact with each other. Therefore, the gap between vibrator 380 and coil 340 and the size of vibration generator 301 in the up-and-down direction can be reduced, with vibrator 380 being certainly maintained in the movable state. Since the gap between vibrator 380 and coil 340 can be reduced, the force acting between vibrator 380 and coil 340 can be increased, and a big vibration can be obtained.

Aside from this, since the second embodiment has features similar to those of the first embodiment, effects similar to those described above can be obtained.

Modification of Second Embodiment

Figure 16:
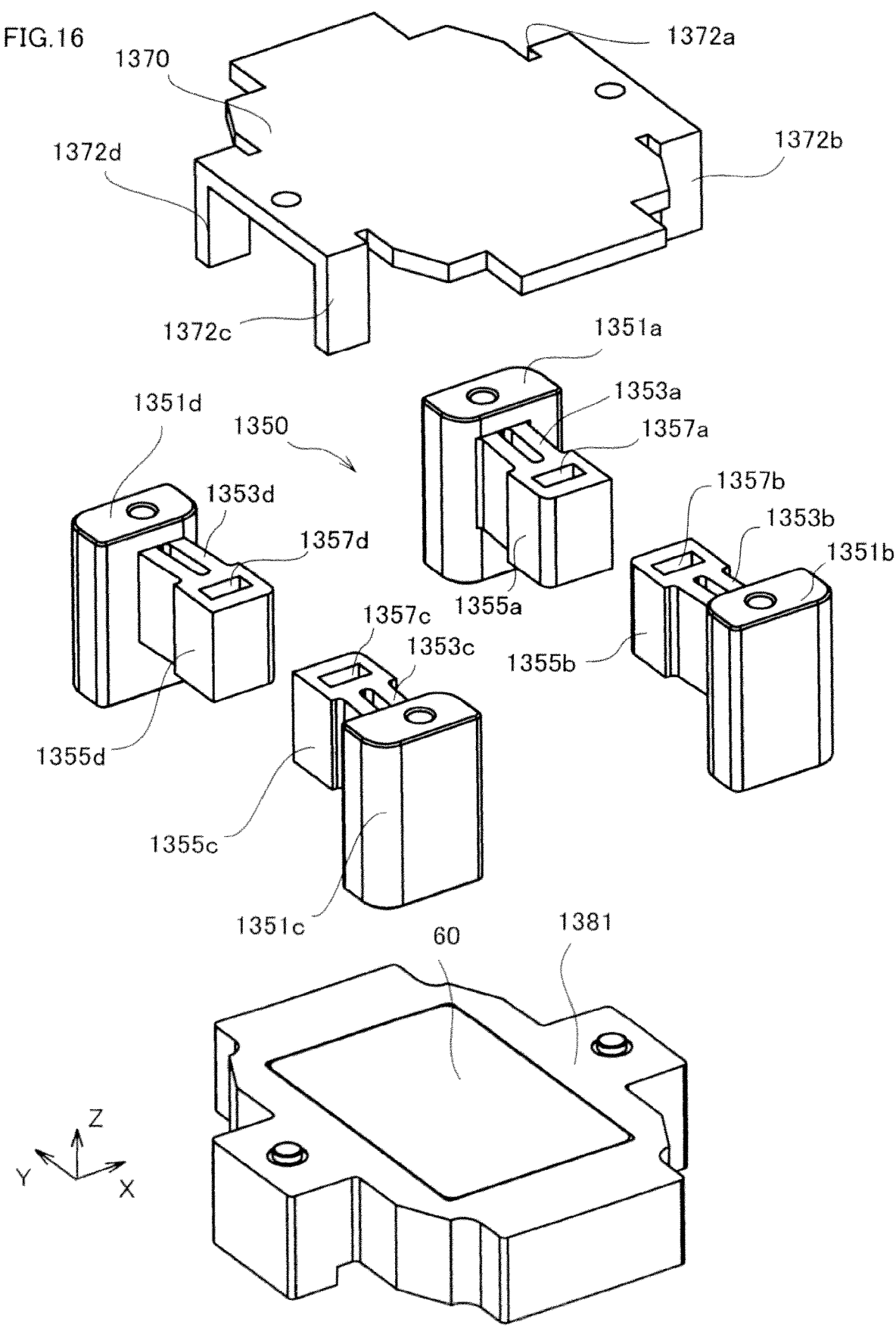
FIG. 16 is an exploded perspective view illustrating a vibrator-mounted holder of a vibration generator according a first modification of the second embodiment.
Figure 17:
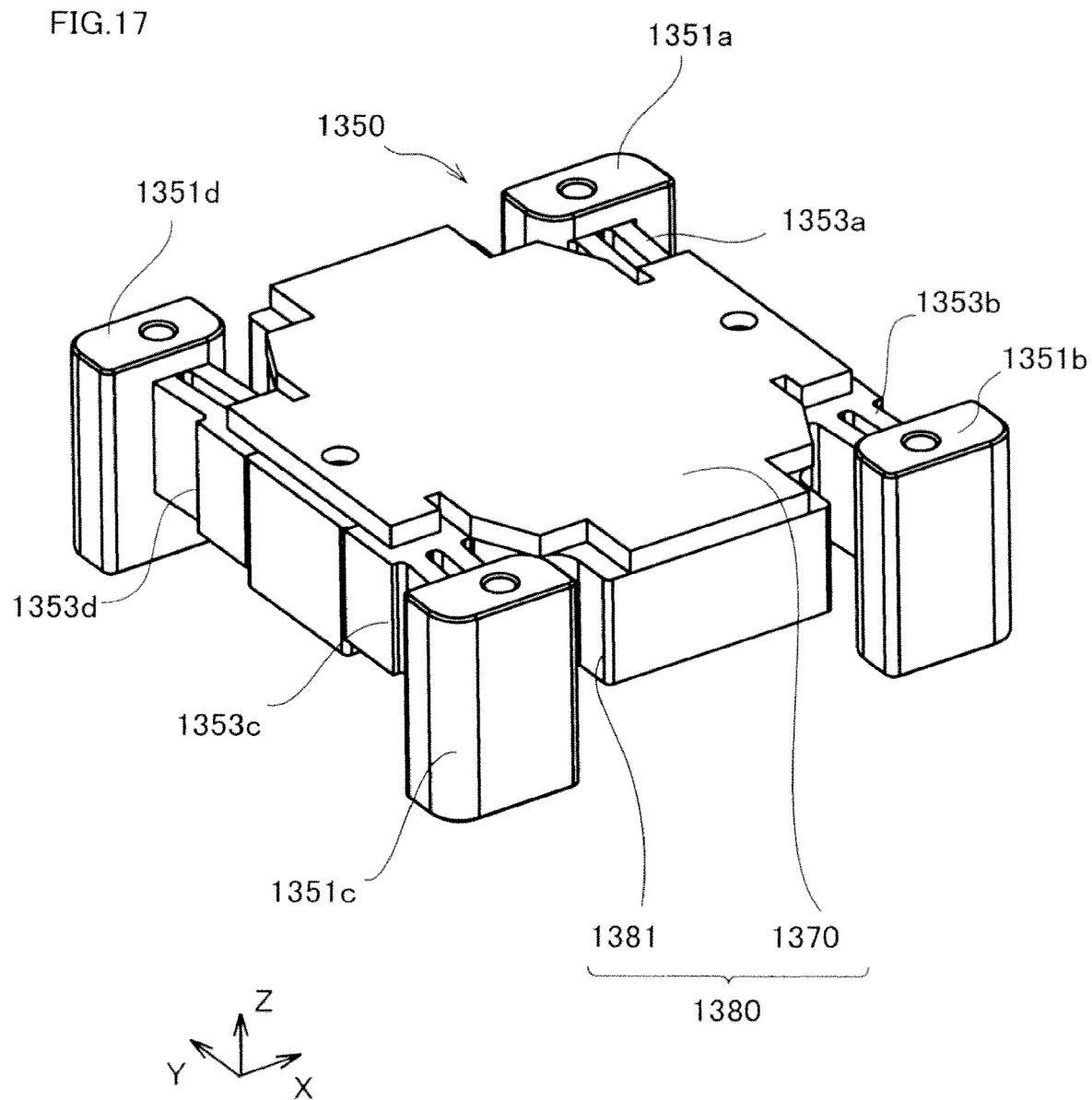
FIG. 17 is a perspective view illustrating the vibrator-mounted holder.

FIG. 16 is an exploded perspective view illustrating a vibrator-mounted holder of a vibration generator according a first modification of the second embodiment. FIG. 17 is a perspective view illustrating the vibrator-mounted holder.

As illustrated in FIG. 16, in the present modification, a vibrator 1380 and a holder 1350 which are thick in an up-and-down direction and which are slightly large are used. In the present modification, holder 1350 is divided into four pieces and each piece includes a pillar body 1351 (1351a to 1351d), an arm 1353 (1353a to 1353d) constituted by two beams, and a retention unit 1355 (1355a to 1355d). Four retention units 1355 retain a weight 1381 with an end portion of a weight 1381 interposed between two retention units 1355 adjacent to each other. For example, as for retention unit 1355a, weight 1381 is retained such that weight 1381 is interposed between retention unit 1355a and retention unit 1355b and between retention unit 1355a and retention unit 1355d.

Magnet 60 is arranged in a center portion of weight 1381. Even in the present modification, a yoke 1370 is arranged on magnet 60. End portions of yoke 1370 are bend down to form projected portions 1372 (1372a to 1372d), end portions corresponding to respective retention units 1355. Recessed portions 1357 (1357a to 1357d) are formed in retention units 1355, respectively so that projected portions 1372 may be buried therein. As illustrated in FIG. 17, yoke 1370 is attached to holder 1350 in the state where each projected portion 1372 is arranged in each retention unit 1355 in a manner that the almost entire part of each projected portion 1372 is buried in corresponding recessed portion 1357. In other words, retention units 1355 are formed to encase projected portions 1372, respectively. In addition, holder 1350 is integrally molded to encase each projected portion 1372, and thus each projected portion 1372 can be more certainly retained by each retention unit 1355.

This holder 1350 is attached to a chassis of a vibration generator when arm 1353 is switched to an extended state from a natural state. In this case, even in the present modification, since arms 1353 are in contact with retention units 1355 into which projected portions 1372 are sunk, vibrator 1380 is not displaced in the up-and-down direction in response to extension of arms 1353. Therefore, the same effect as that described above can be obtained.

In the second embodiment, the attachment structure for attaching the pole to frame is not limited to the press-fitting structure described above. The pole may be attached to the frame through welding, bonding, a coupling method using a screw, or the like. Each pole may be provided with a flange which comes into contact with the body of frame.

Figure 18:
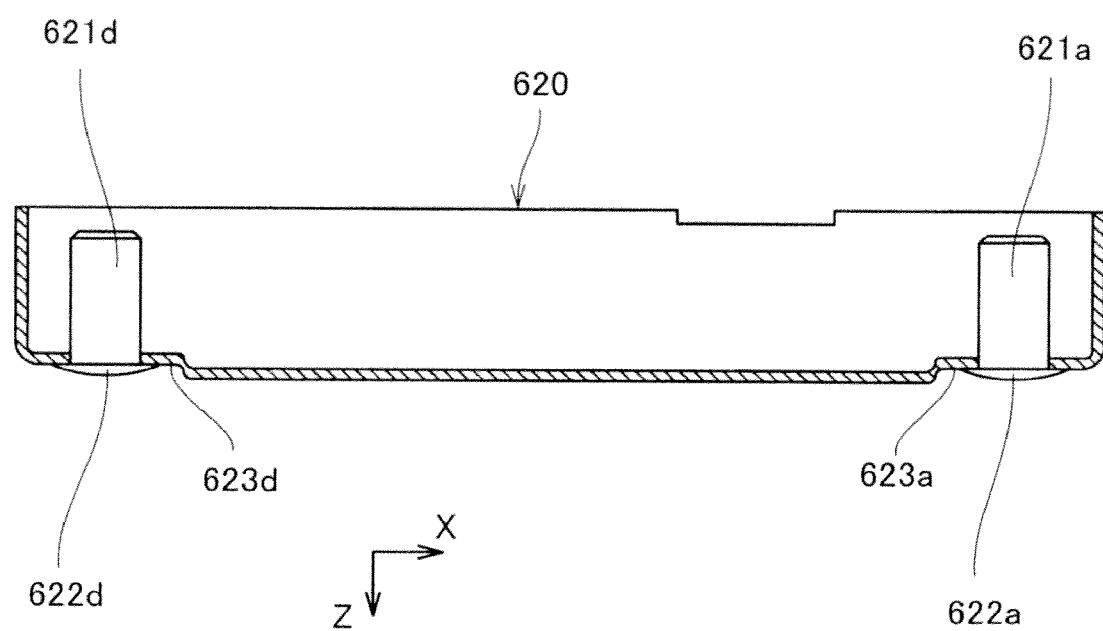
FIG. 18 is a cross-sectional view of a frame used for a vibration generator according to a second modification of the second embodiment.

FIG. 18 is a cross-sectional view of a frame 620 used for a vibration generator according to a second modification of the second embodiment.

FIG. 18 is a view illustrating a section corresponding to the section illustrated in FIG. 11.

As illustrated in FIG. 18, the basic structure of frame 620 is the same as that of frame 520 described above. Frame 620 differs from frame 520 in the point that frame 620 includes poles (an example of the protruding portions) 621 (621a and 621d) instead of poles 521 and step portions 623 (623a and 623d). The step portions 623 are provided in portions, at which poles 621 are arranged, within the upper surface of the body (lower side portion in FIG. 18), and are one step lower than other portions. In FIG. 18, only two poles 621 and two step portions 623 are illustrated. However, poles 621 and step portions 623 may be present in the number of four each like in frame 520.

As illustrated in FIG. 18, an upper end portion of each pole 621 is provided with a flange-like head 622 (622a and 622d) having a diameter larger than that of the trunk of each pole 621. Head 622 is configured such that the height in an up-and-down direction is smaller than the height of the step from the upper surface of frame 520 to the upper surface of step portion 623.

Each pole 621 is attached to frame 620 such that each pole 621 is inserted, from the upper side to the lower side, into a hole (not illustrated) formed in each step portion 623 and head 622 is caught by step portion 623. Each pole 621 is fixed to frame 620 in a manner that the periphery of head 622 is welded to step portion 623. With the provision of head 622, the size of each pole 621 which protrudes down can be managed with high precision, the vibration generator having a precise structure can be easily manufactured.

In this way, attachment strength of pole 621 to frame 620 can be enhanced by fixing pole 621 to frame 620 by welding. Therefore, the durability of the attachment structure of pole 621 with respect to vibration etc. can be raised. Since frame 620 is provided with step portion 623, it is possible to prevent a welded portion from being projected down from the upper surface of frame 620.

Alternatively, frame 620 may not be provided with step portion 623. Pole 621 may not be provided with head 622.

Figure 19:
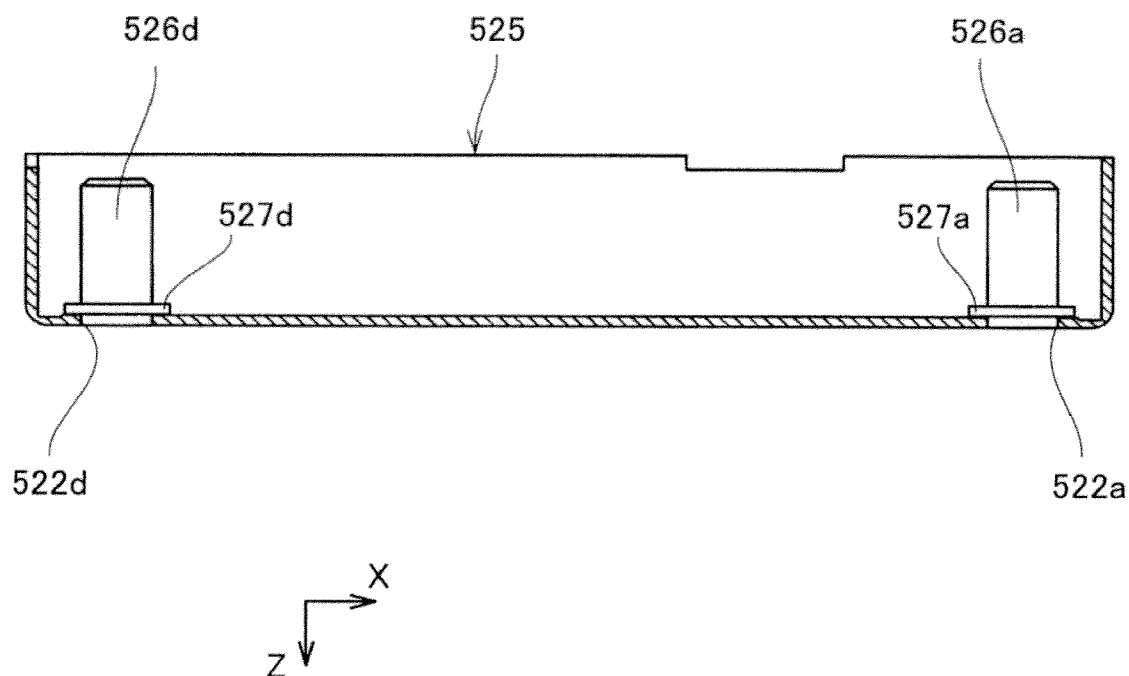
FIG. 19 is a cross-sectional view of a frame used for a vibration generator according to a third modification of the second embodiment.

FIG. 19 is a cross-sectional view of a frame 525 used for a vibration generator according to a third modification of the second embodiment.

FIG. 19 is a view illustrating a section corresponding to the section illustrated in FIG. 11.

As illustrated in FIG. 19, the basic structure of frame 525 is the same as that of frame 520 described above. Frame 525 differs from frame 520 in a point that frame 525 includes poles 526 (526a and 526d) provided with flanges 527 (527a and 527d). In FIG. 19, as for poles 526 and flanges 527, only poles 526a and 526d and flanges 527a and 527d are illustrated. However, poles 526 and flanges 527 may be present in the number of four each like in frame 520.

Flange 527 is formed in a position which is slightly lower than an upper end portion of pole 526, for example, by an amount corresponding to the thickness of the body of frame 525. Flange 527 has a little bigger diameter than the trunk of pole 526.

Thus, since poles 526 are provided with flanges 527, poles 526 are attached in a manner that poles 526 are press-fitted into press-fitting holes 522 until flanges 527 move from the inside surface of frame 525 and come into contact with a top panel of the body of frame 525. Thereby, a distance from the top panel of the body of frame 525 to a lower end portion of pole 526 can be easily managed, and the vibration generator can be easily assembled with high precision.

In the second embodiment, the hole provided in the pillar body of the holder may be a closed-end hole. In this case, it may be constituted so that the length of the pole formed in the frame may be reduced. Thus, when each hole is a cylinder-like closed-end hole, the holder can be easily molded. That is, resin easily surrounds the entire surface of the pillar body at the time of molding the holder. Therefore, so-called surrounding leakage of resin can be prevented, and thus the holder can be easily molded. In particular, by providing a gate for allowing resin to flow out therethrough in a position near each pillar body, this effect can be more certainly obtained.

[Others]

The vibration generator may be constituted by suitably combining features in each embodiment or and its modifications described above. For example, in the vibration generator according to the second embodiment, a double-sided substrate such as a glass epoxy substrate used in the first embodiment may be used instead of the flexible printed circuit board. When using a double-sided substrate in this way, the manufacturing cost of the vibration generator can be reduced.

In the second embodiment described above, the notch portion of the bottom plate may be provided with a round-chamfered portion. The round-chamfered portion may be provided in an edge portion which is formed when the notch portion is formed, for example. Therefore, although the substrate which is an FPC is bent in the notch portion, stress is unlikely to be applied to the substrate and breakage of the substrate, or the like can be more certainly prevented.

A frame may not be limited to iron but may be made of other materials. For example, it may be a resin body which is formed separately from a holder. The frame may not be provided with an upper surface and a bottom surface and may surround the periphery of the holder when viewed from above. The frame may be a square when viewed from above.

The circuit board may not be needed. The bottom plate may not cover the whole surface of the bottom of the frame but may be arranged at a portion of the bottom of the frame.

The number of protruding portions provided for the yoke may be 4, or may be an odd number. The surface of the protruding portion is limited to neither a spherical surface nor a curved surface. The above effects can be acquired when the protruding portion is formed such that a portion of a limited area of the protrusion comes into contact with the inside of the frame.

The number of pillar bodies and the number of arms may be two or more. The pillar body may not be a cylindrical shape but may be a polygonal prism shape. The holder may not be an integrally formed body, but may be a body in which a plurality of members are assembled.

The attachment structure of the holder to the frame is not limited to the structure in which two claws engage the pillar body or the structure in which each pole fits the hole of the pillar body. In the attachment structure of the holder to the frame, the fixed unit having another shape on the holder side may engage engaging unit formed in the frame. For example, a hole-shape engaging unit is formed in the frame, and the projection on the holder side may be fitted in the engaging unit to attach the holder to the frame.

The holder is not limited to one that formed by single-color molding. For example, the pillar body, the retention unit, and the arm may be integrally molded by the two-color molding using different materials.

The attachment structure of the vibrator to the holder, namely, the attachment structure of the magnet and the yoke to the holder is not limited to the insert molding. For example, the magnet and the yoke, which are joined to each other by the welding, may be assembled in and bonded to the integrally-molded holder in a process different from the process of molding the holder. Alternatively, the holder and the yoke may be integrally molded and then the magnet may be attached to the yoke.

The attachment structure for attaching the vibrator to the holder, i.e., the attachment structure for attaching the magnet and yoke to the holder is not limited to an article prepared through insert molding. For example, the attachment structure may be a structure obtained by incorporating the magnet and yoke which are mutually joined through welding or the like into the integrally-molded holder in a process different from a molding process of the holder, and then bonding them each other. Alternatively, the holder and yoke may be integrally formed and after that the magnet may be attached to the yoke.

The weight may be arranged in the center portion of the magnet, etc. The weight may be arranged in a portion of the magnet which does not greatly affect generation of force for moving the vibrator. Thereby, the vibration generator which enables miniaturization of the vibrator and can generate a big vibration force can be obtained.

The vibration generator which can drive a vibrator may be constituted by attaching the coil to the main substrate of an apparatus using a vibration, etc., and attaching the frame, to which the holder is attached, to the main substrate which is mounted with coil already. In other words, the vibration generator may be constituted by using the coil mounted on the substrate of other apparatus.

The configuration of the above holder is not limited to that of the holder for the vibration generator described above, but can be widely applied. That is, the holder is configured such that a movable unit (a portion serving as the vibrator in the above embodiment), in which the magnet is provided, can be displaced via the arm with respect to a portion supported by the frame. Such a holder can be used for an actuator driven using magnetism, an apparatus which suitably displaces a moving unit in a predetermined direction, and other various types of apparatuses. When the holder is configured to have the same structure, the same effect as above can be obtained even in other apparatuses different from the vibration generator. For example, when the yoke portion of the holder is provided with the protruding portion, it is possible to restrict the portion where the movable unit and the frame can come into contact with each other, and thus the apparatus can be properly operated.

The vibration generator is not limited to a small one which is described above. Even when the vibration generator is configured in a large size with the same structure, the same effect as above can be obtained.

According to the embodiment described above, the arm is connected to a portion of the vibrator retention unit, at which the protrusion is arranged, and the vibrator-mounted holder is attached to the chassis in a state where the arm is extended from a natural state. Therefore, a vibrator-mounted holder and a vibration generator, which can be easily assembled, can be manufactured at low cost, and have high reliability, can be provided.

It should be understood that the embodiments described above are illustrative and non-restrictive in every respect. The scope of the present invention is defined by the terms of the claims, rather than the description above, and is intended to include any modifications within the scope and meaning equivalent to the terms of the claims.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A vibration generator comprising:
a frame including an upper surface and a side surface;
a bottom plate;
a vibrator;
a coil;
a retention unit; and
an arm connecting the vibrator and the frame via the retention unit,
wherein the vibrator is displaceably supported by the arm with respect to the frame,
a first portion of the retention unit is formed with metal and a second portion of the retention unit is formed with resin, the first portion of the retention unit formed with the metal and the second portion of the retention unit formed with the resin are aligned in a vibrating direction of the vibrator,
a side portion of the vibrator is supported by the second portion of the retention unit formed with the resin in the vibrating direction of the vibrator, and
the metal of the first portion extends from the upper surface of the frame to the bottom plate.

2. The vibrator generator according to claim 1, wherein the retention unit bulges from the arm towards the side portion of the vibrator in a vibrating direction of the vibrator.

3. A vibration generator comprising:
an external form including an upper surface and a side surface configured by a frame and a bottom surface;
a vibrator;
a coil;
a retention unit; and
an arm connecting the vibrator and the frame via the retention unit,
wherein the vibrator is displaceably supported by the arm with respect to the frame,
a first portion of the retention unit is formed with metal and a second portion of the retention unit is formed with resin, the first portion of the retention unit formed with the metal and the second portion of the retention unit formed with the resin are aligned in a vibrating direction of the vibrator,
a side portion of the vibrator is supported by the second portion of the retention unit formed with the resin in the vibrating direction of the vibrator, and
the metal of the first portion extends from the upper surface of the external form to the bottom surface of the external form.

4. The vibrator generator according to claim 1, wherein the retention unit bulges from the arm towards the side portion of the vibrator in a vibrating direction of the vibrator.

* * * * *